Aug. 5, 1924.                                                 1,503,852
A. D. ROGERS ET AL
MACHINE FOR RECEIVING FARES, DELIVERING FARE TOKENS
OR COINS, AND ISSUING TRANSFERS OR TICKETS
Filed Sept. 28, 1921    19 Sheets—Sheet 4
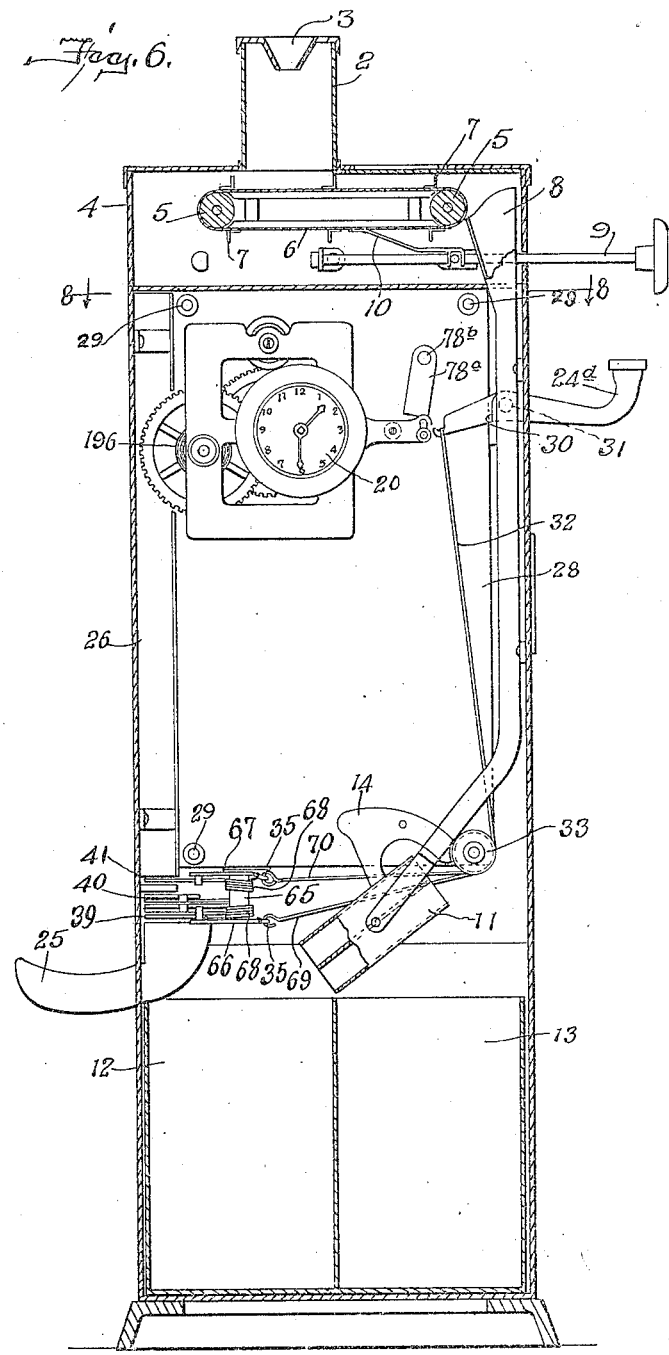
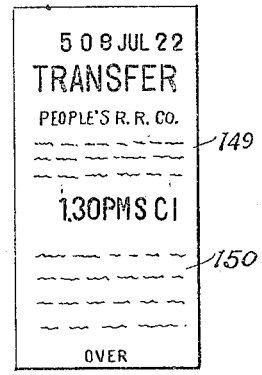
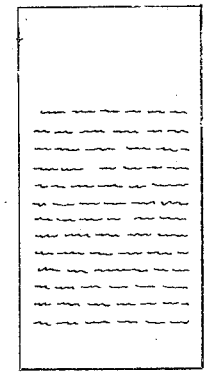
Inventors
Arthur D. Rogers,
William F. Reynolds,
By Poulmin & Poulmin,
Attorneys

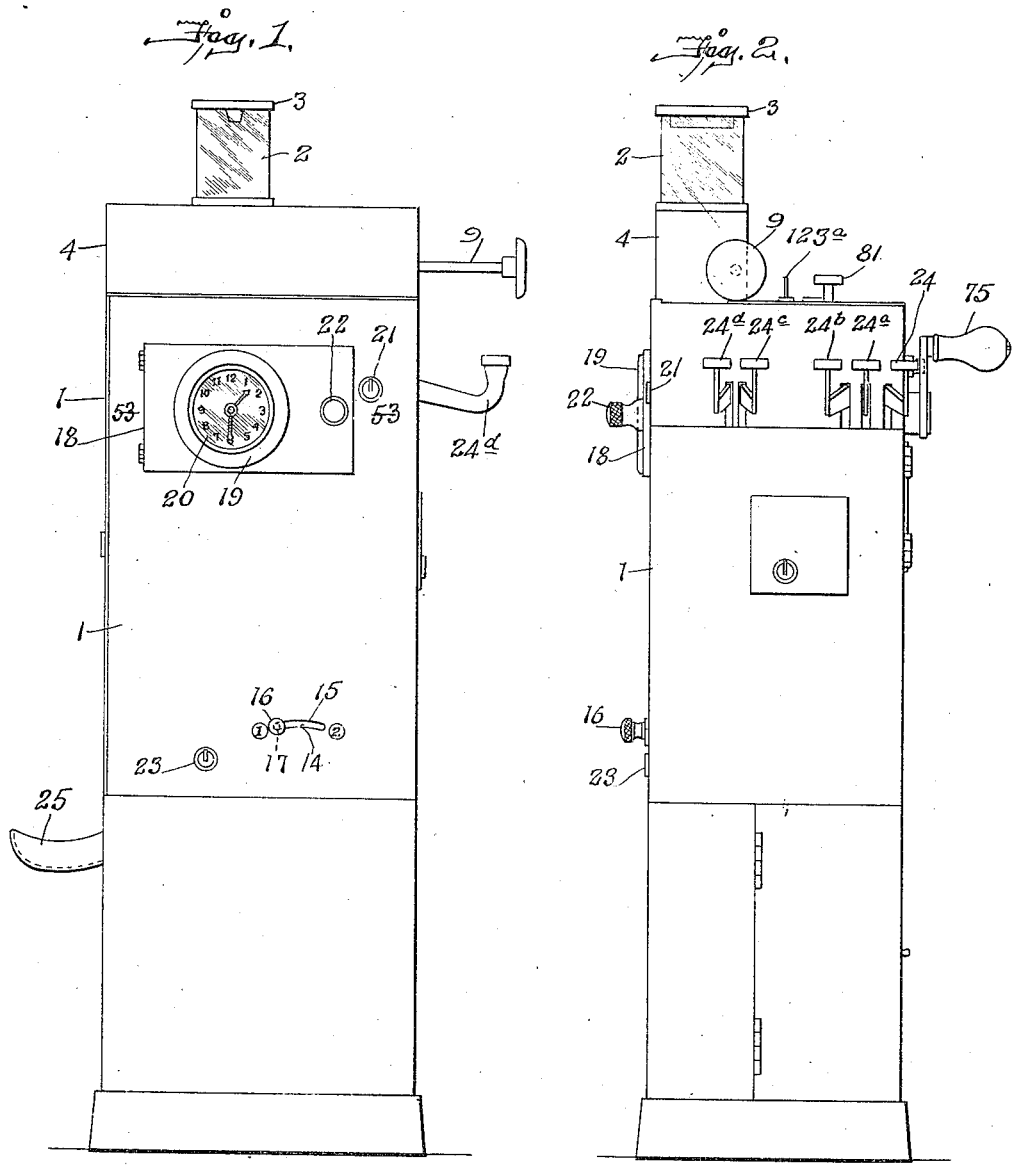

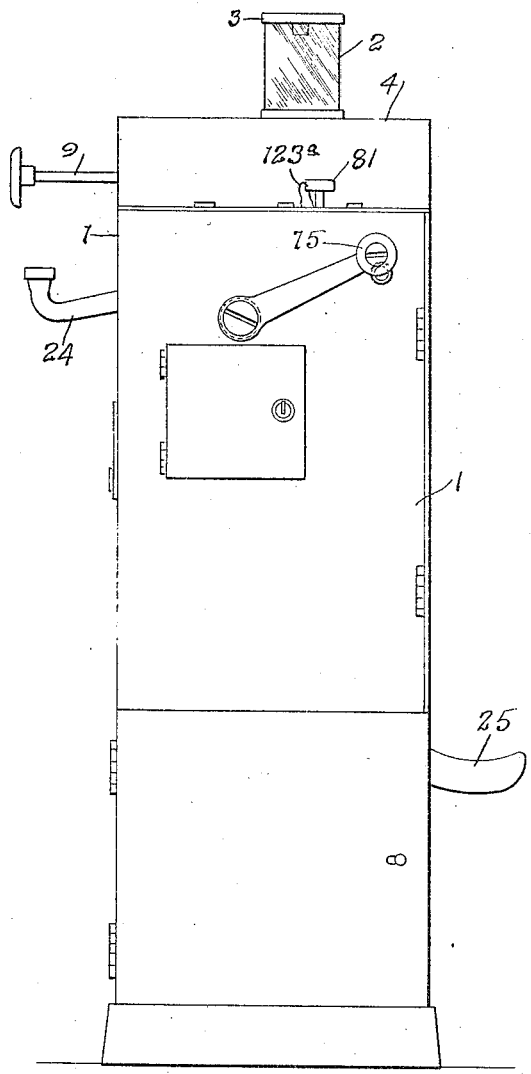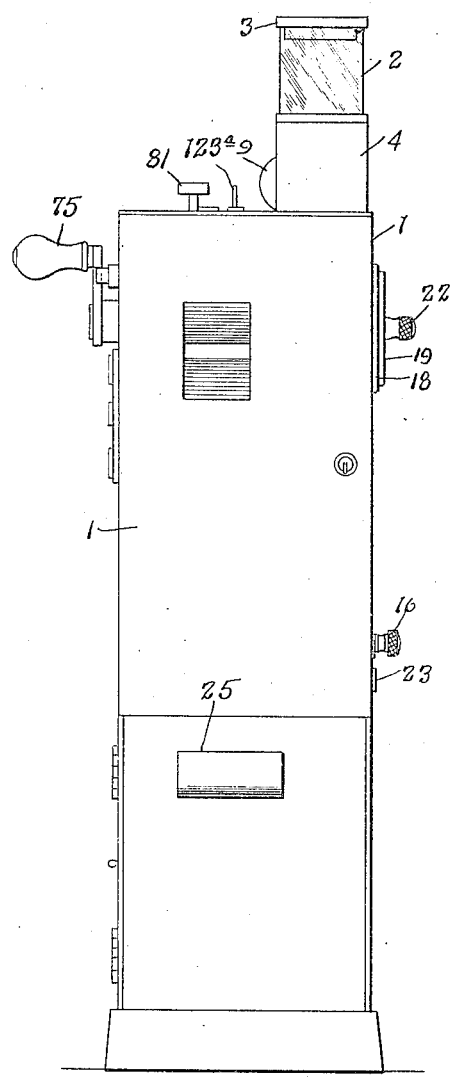

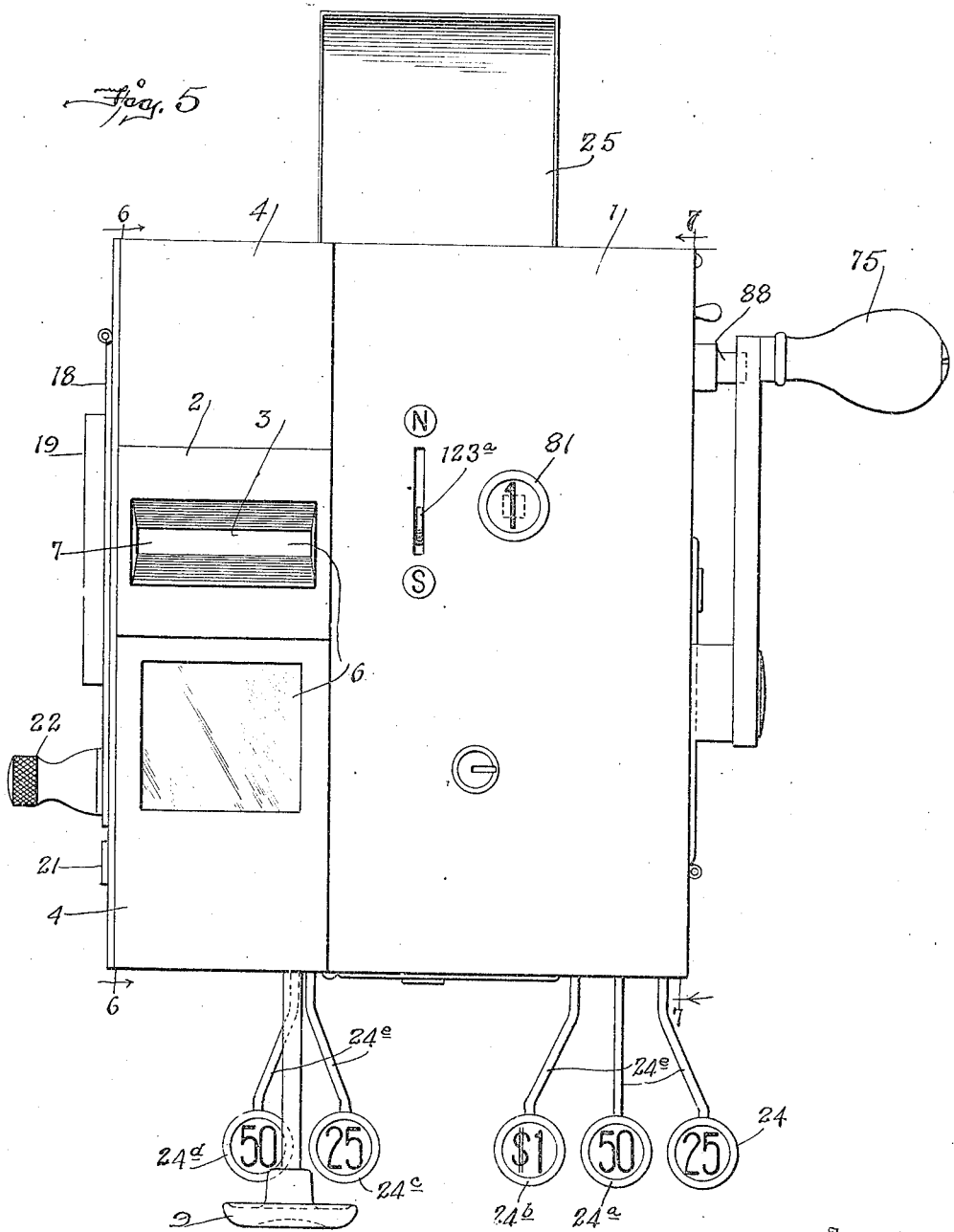

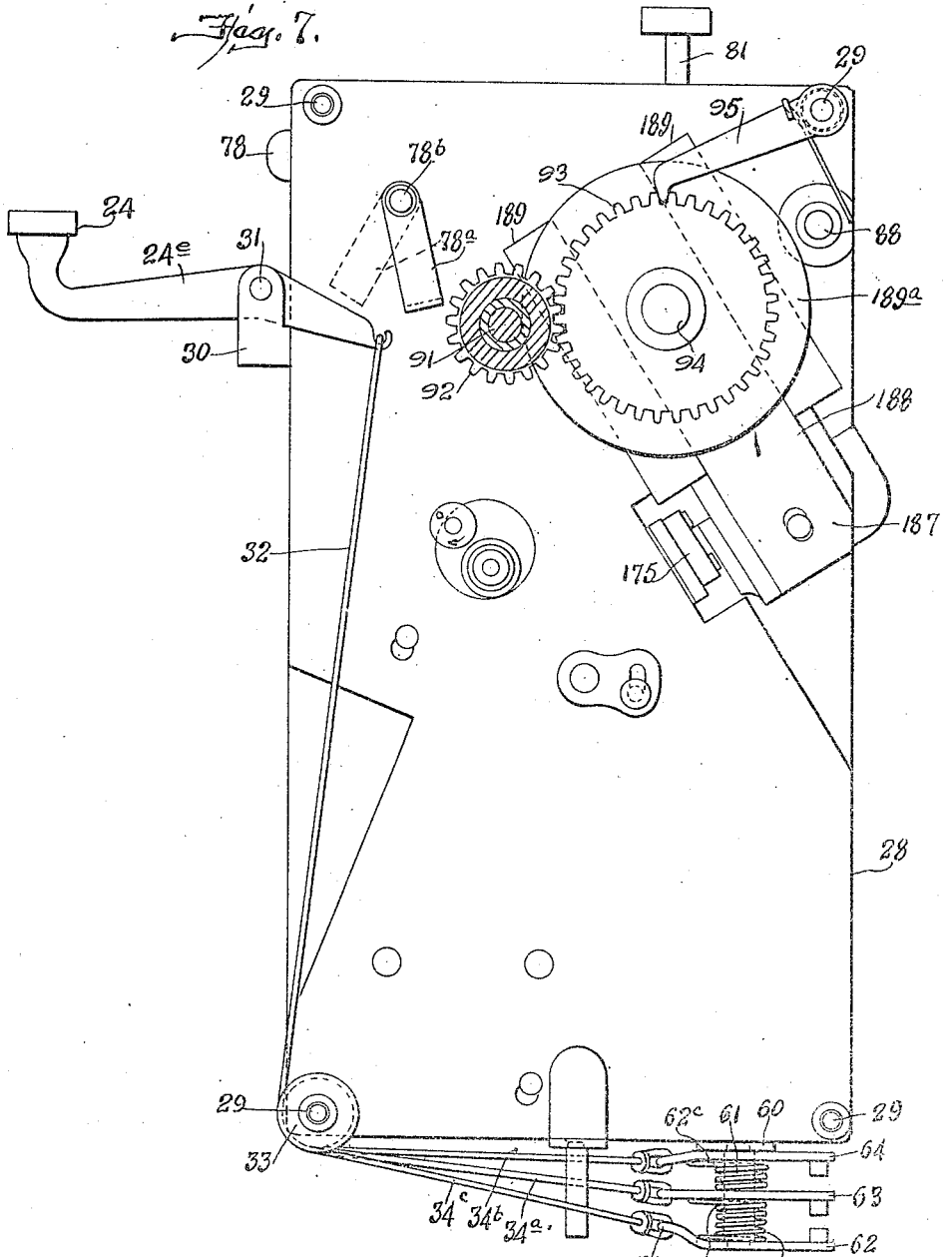

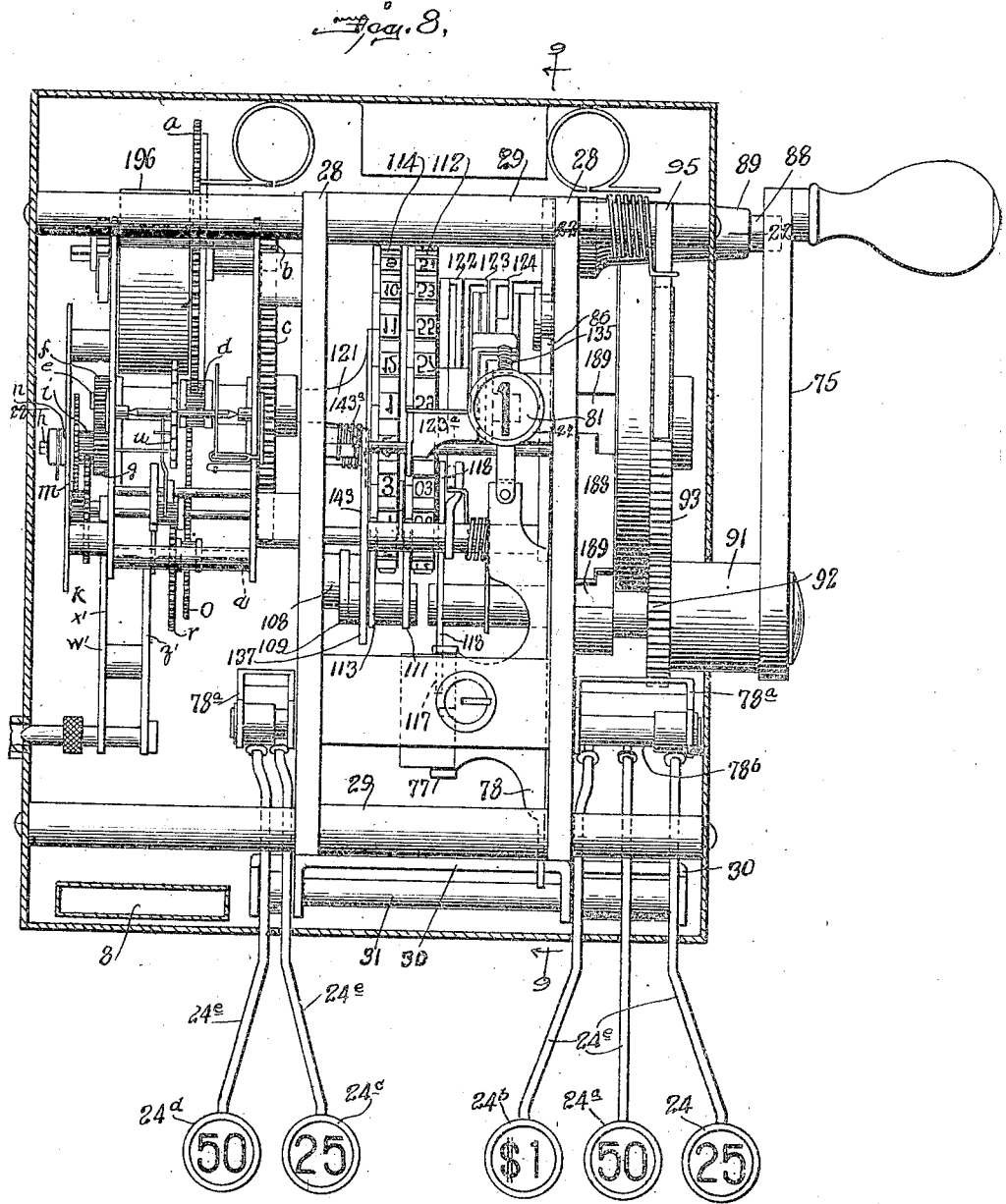

Aug. 5, 1924. 1,503,852
A. D. ROGERS ET AL
MACHINE FOR RECEIVING FARES, DELIVERING FARE TOKENS
OR COINS, AND ISSUING TRANSFERS OR TICKETS
Filed Sept. 28, 1921 19 Sheets-Sheet 7
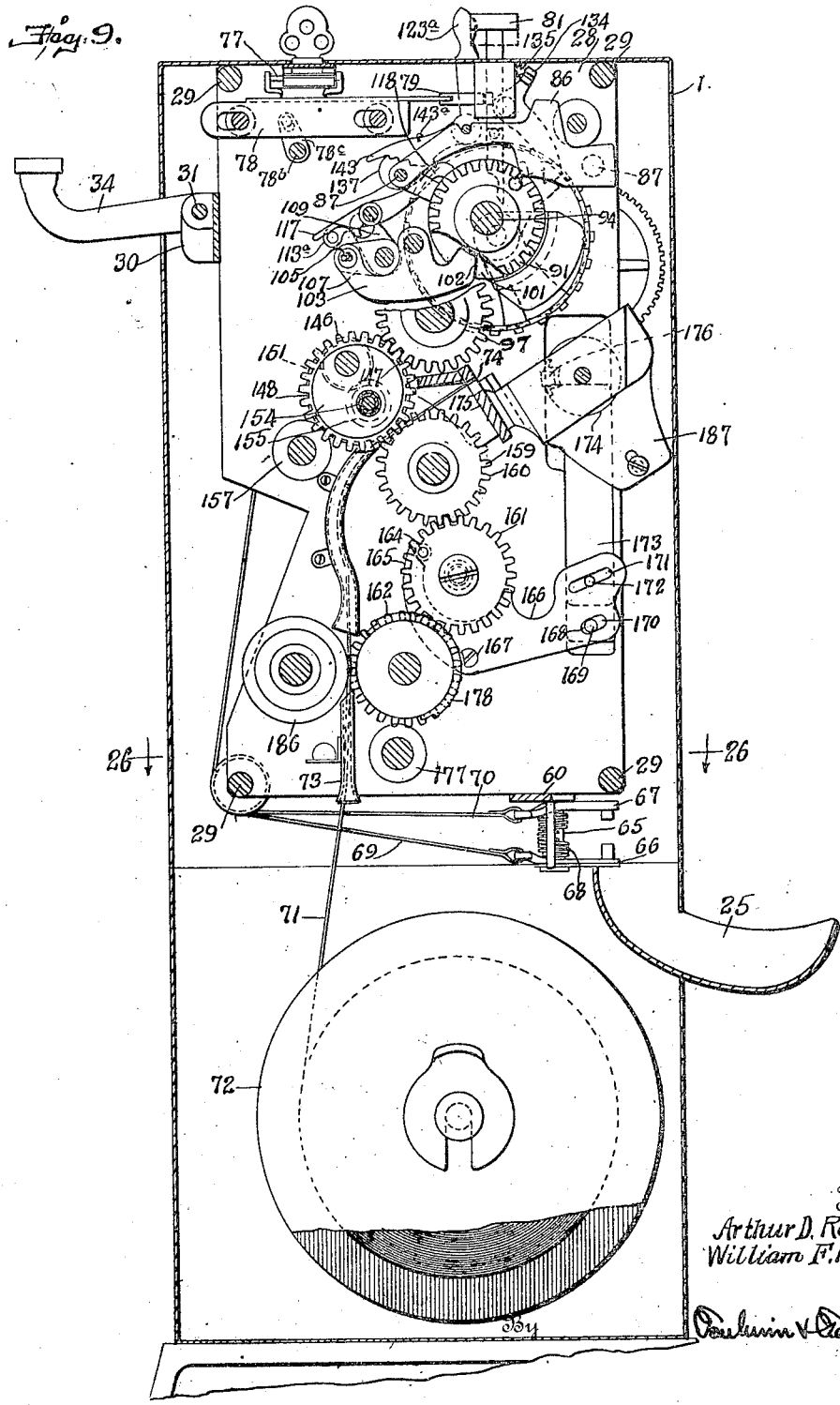
Inventors
Arthur D. Rogers,
William F. Reynolds,
Attorneys

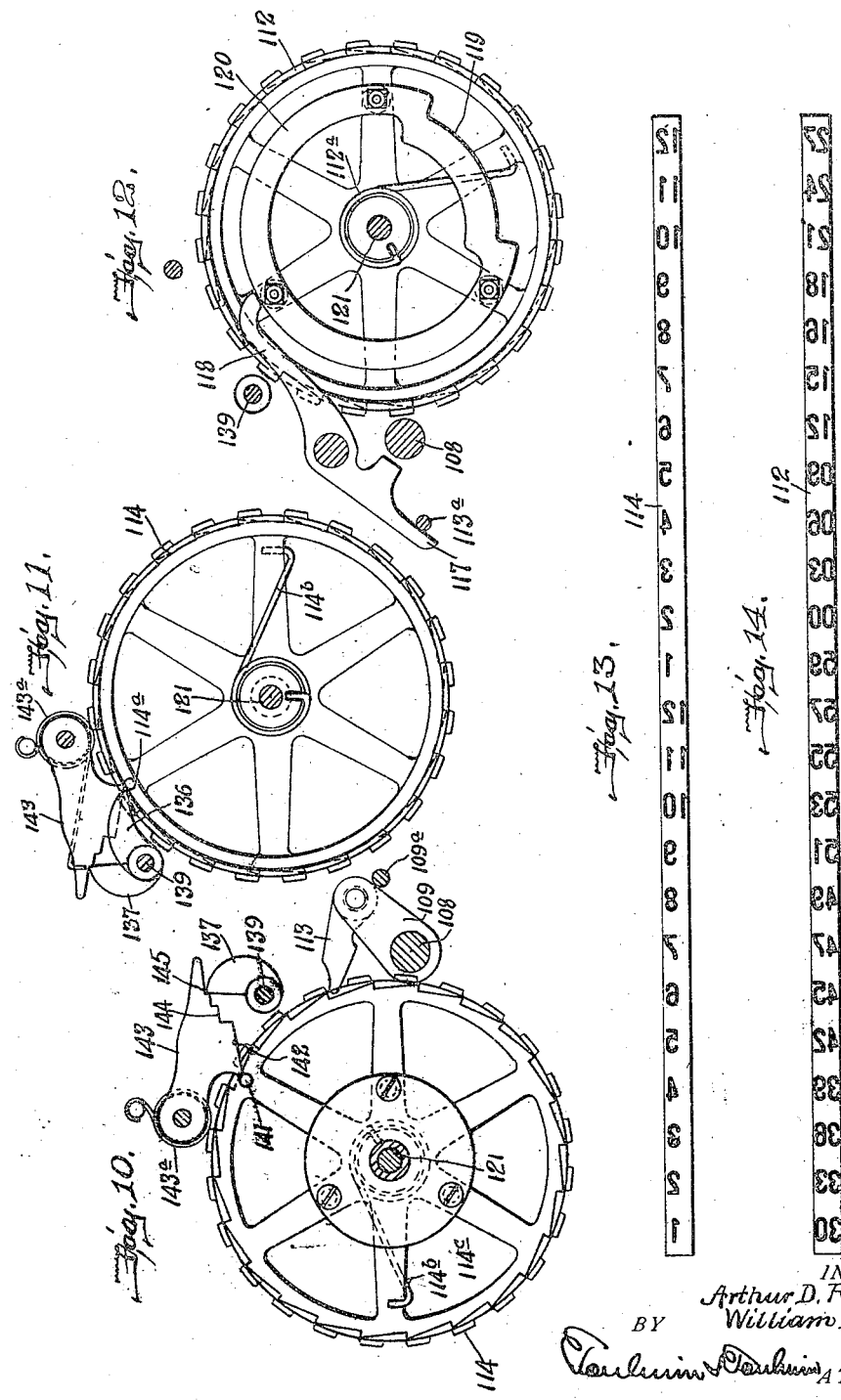

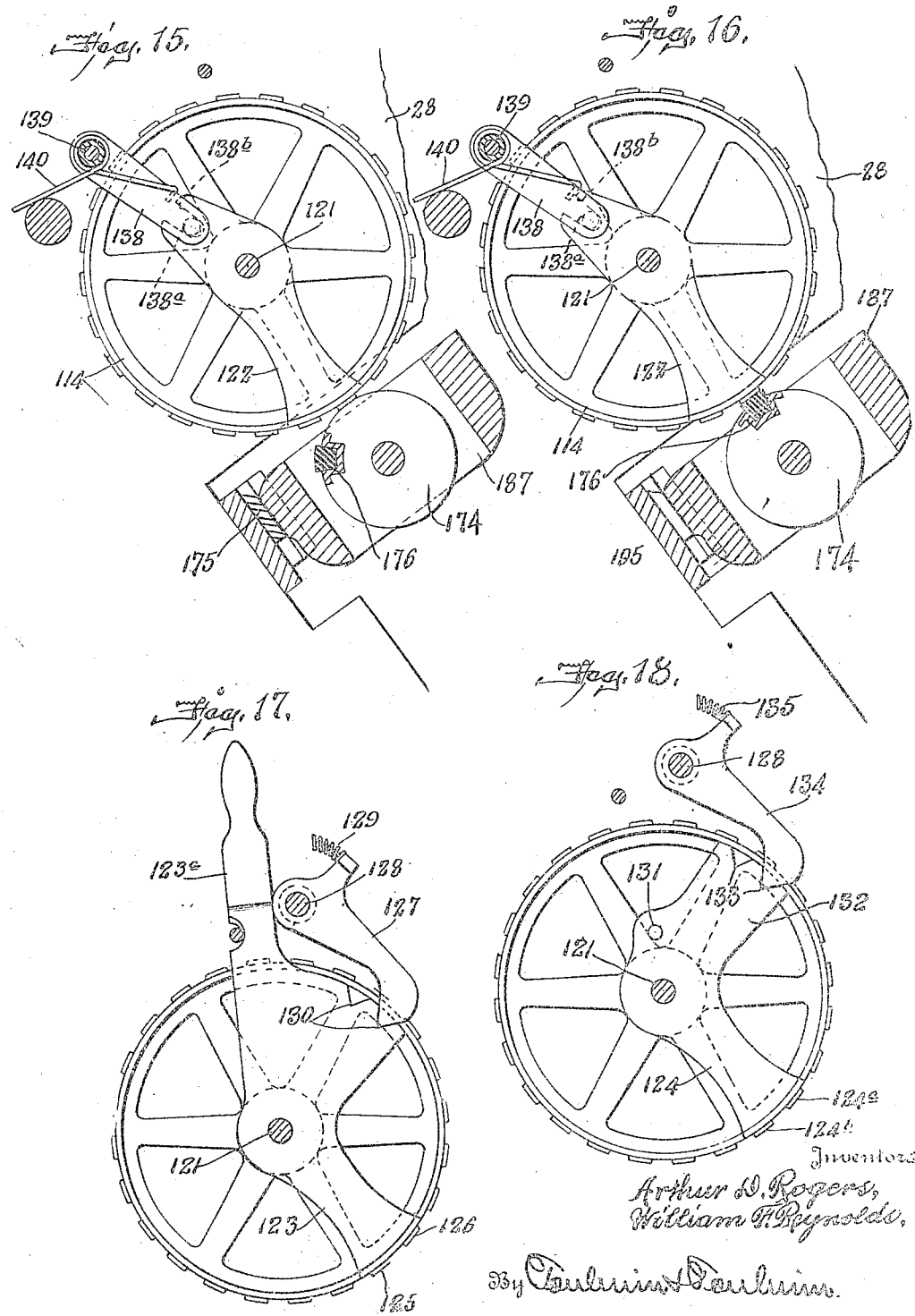

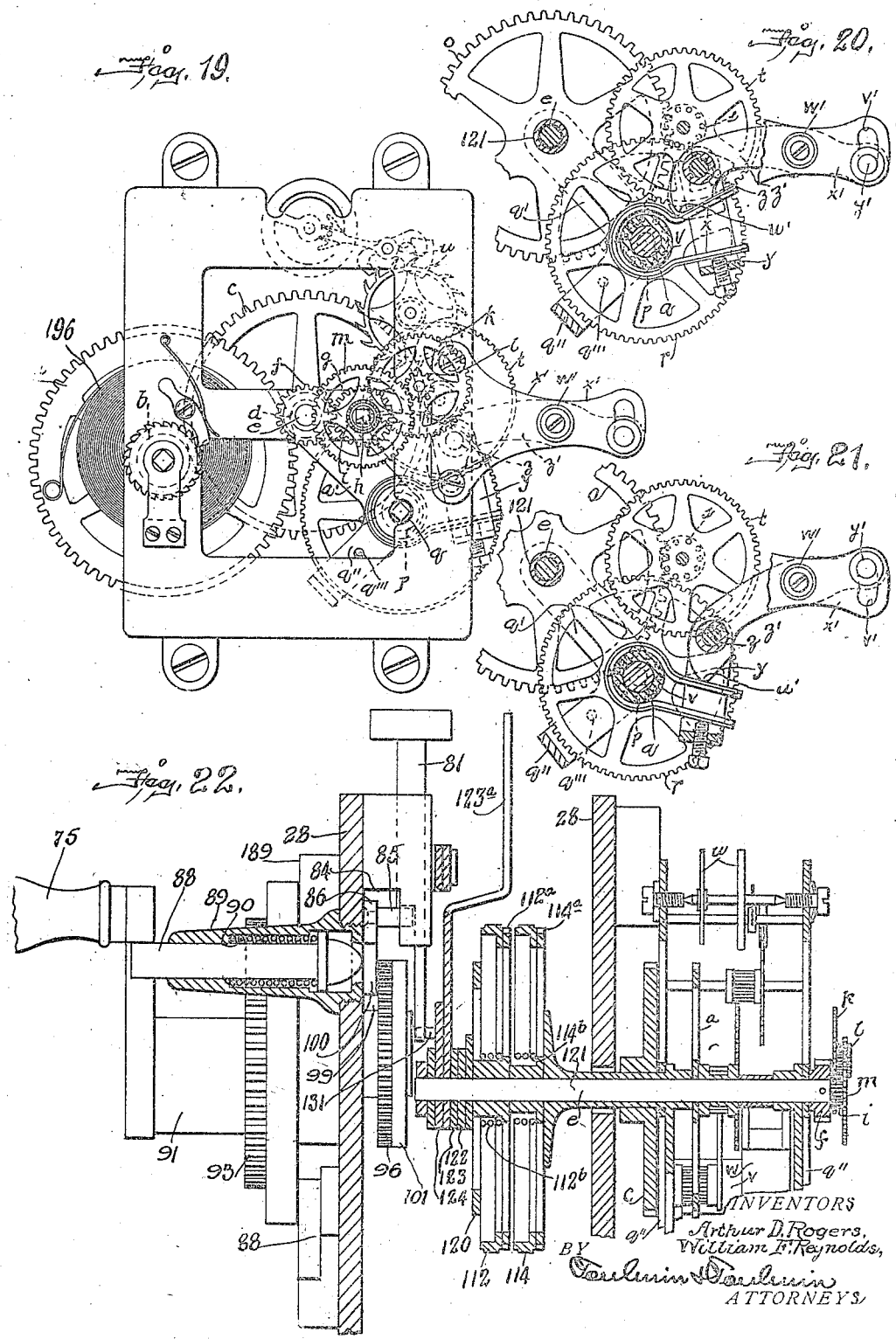

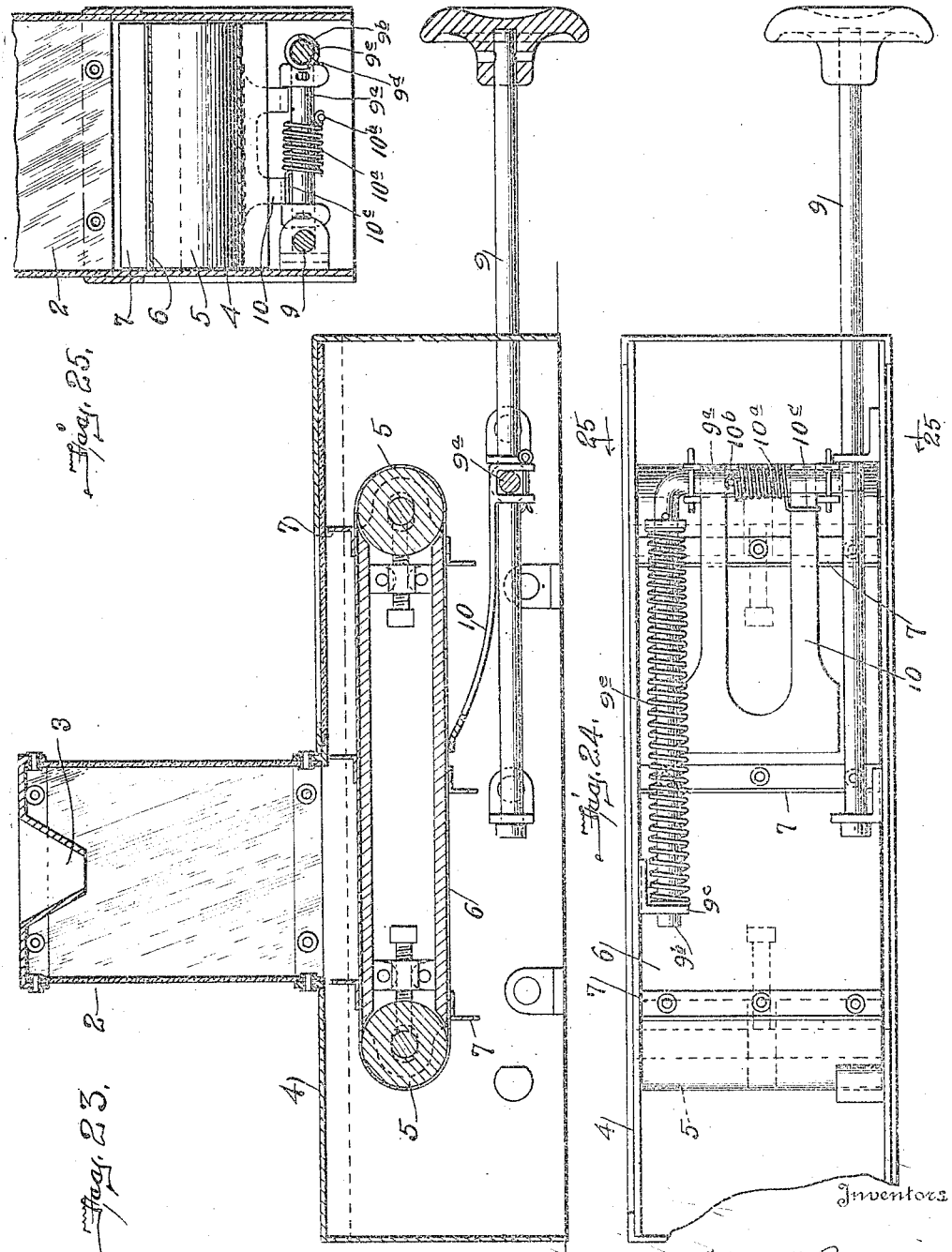

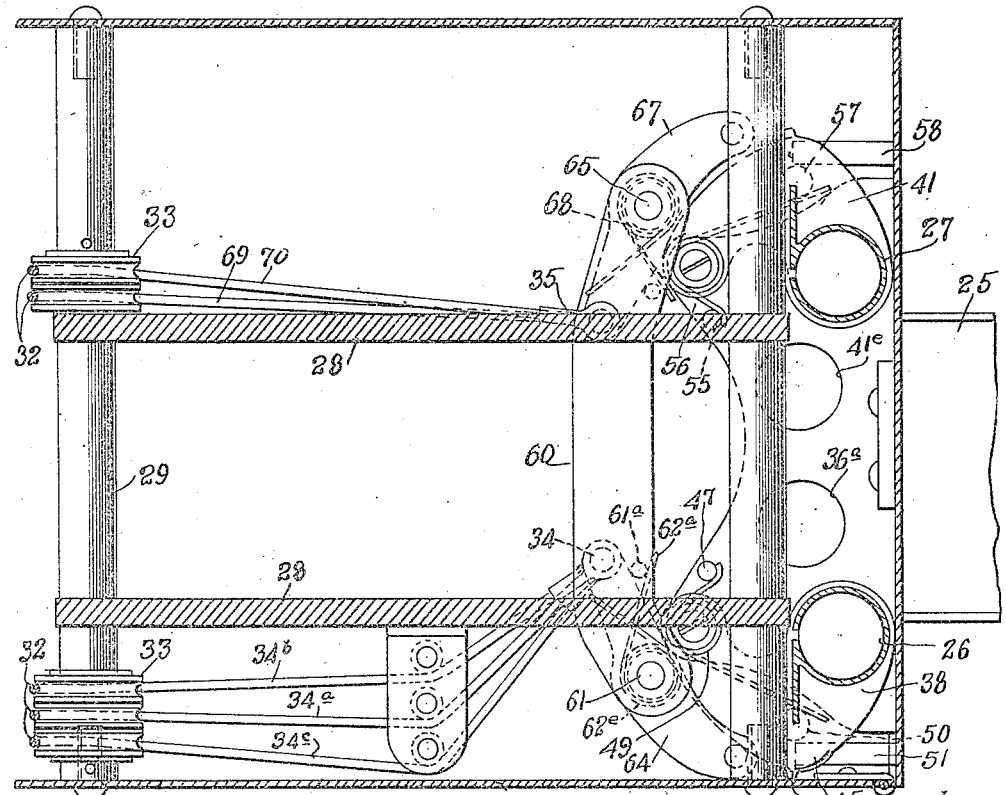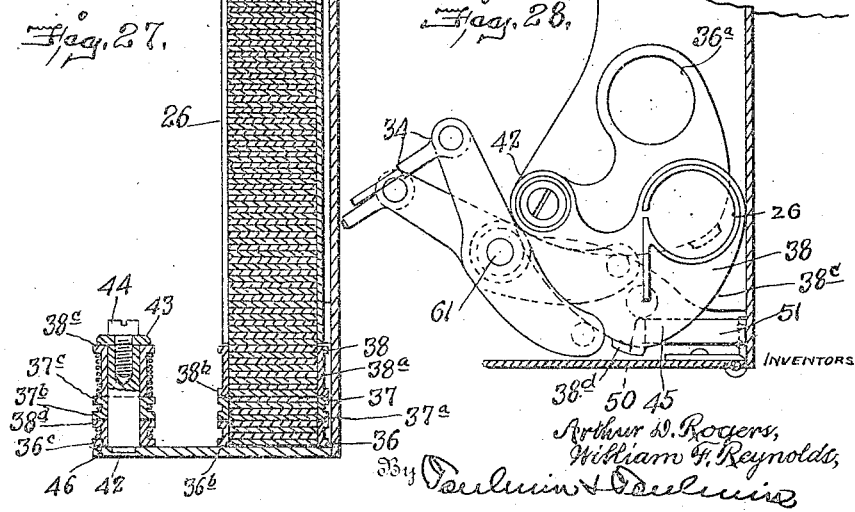

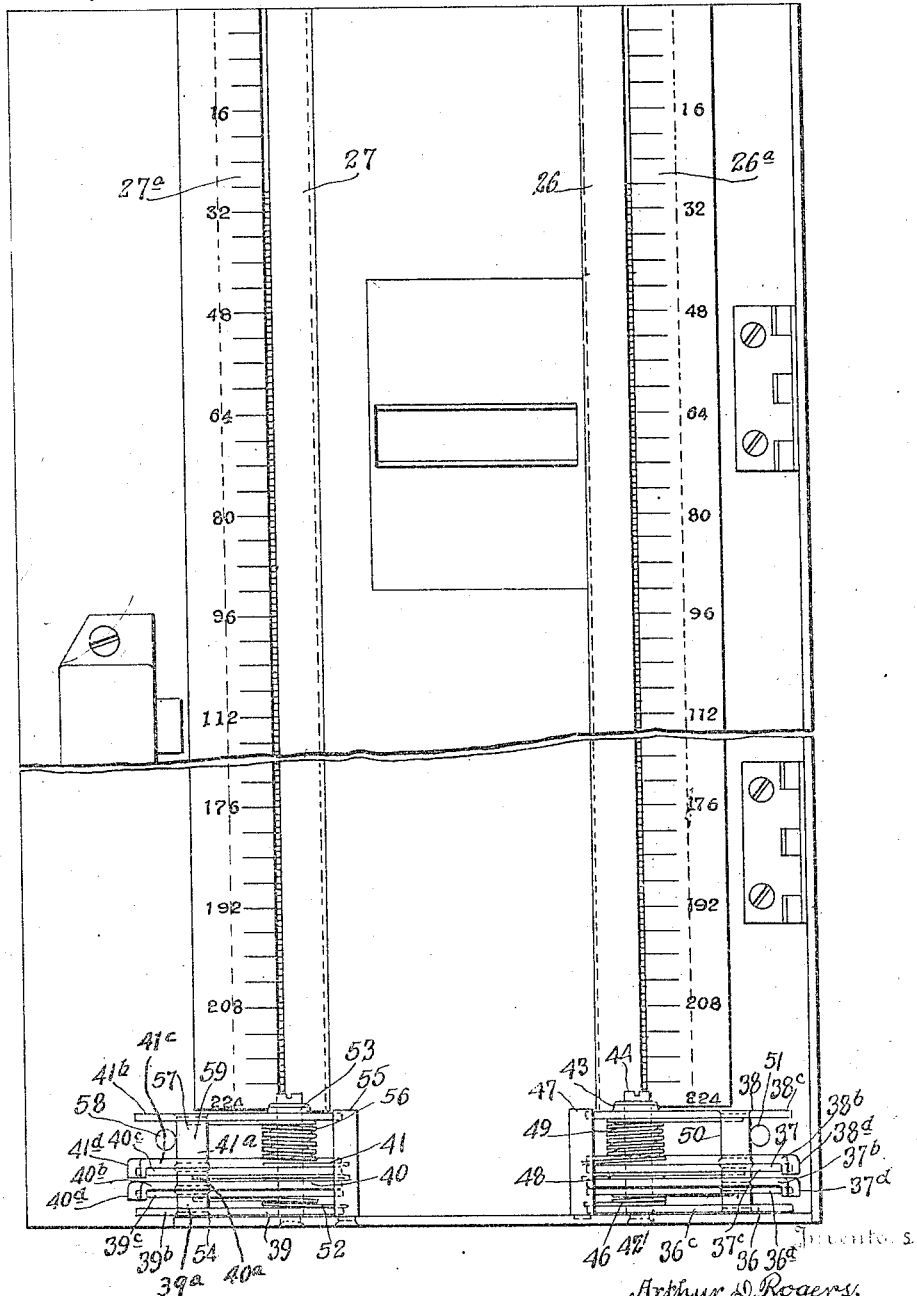

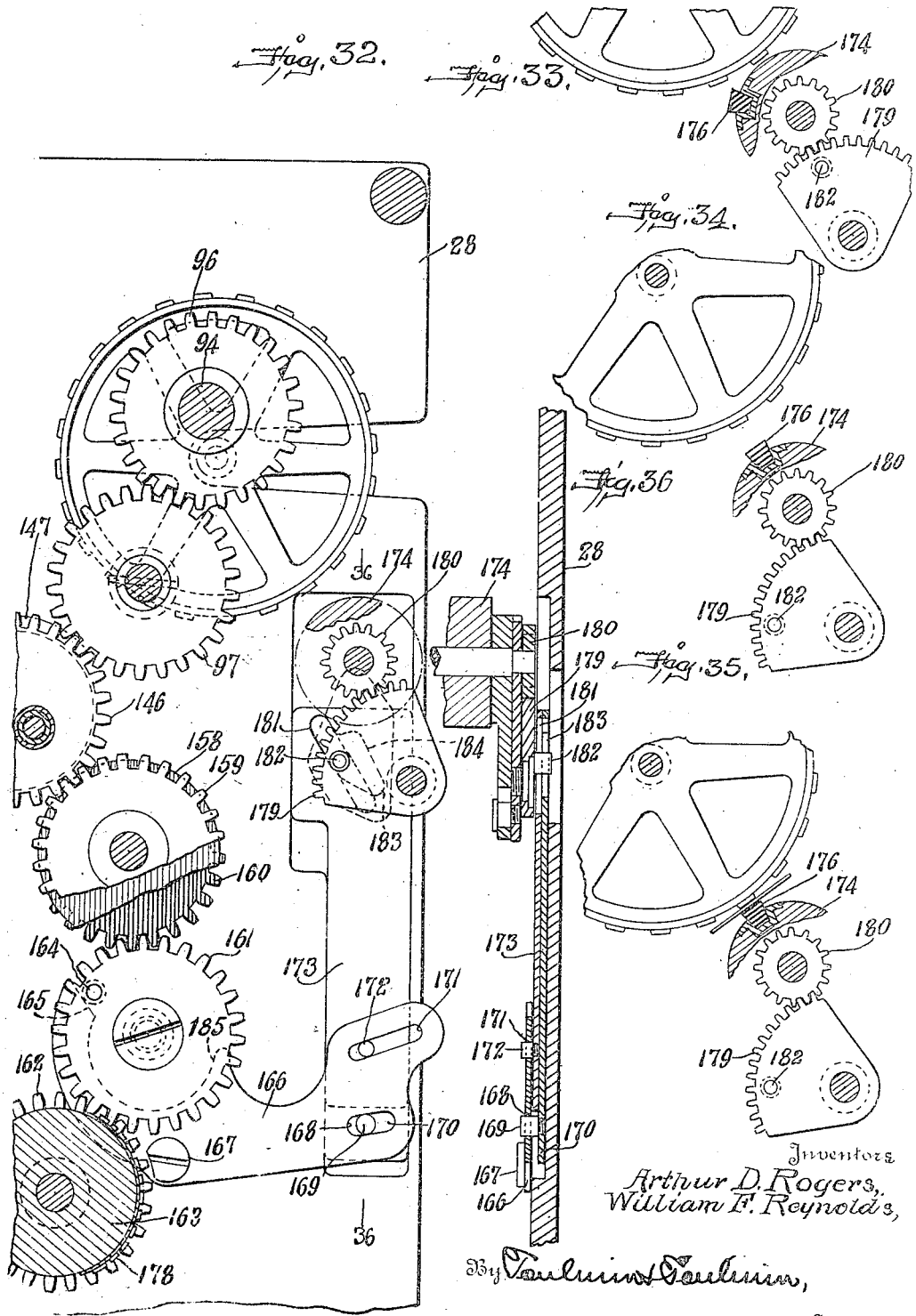

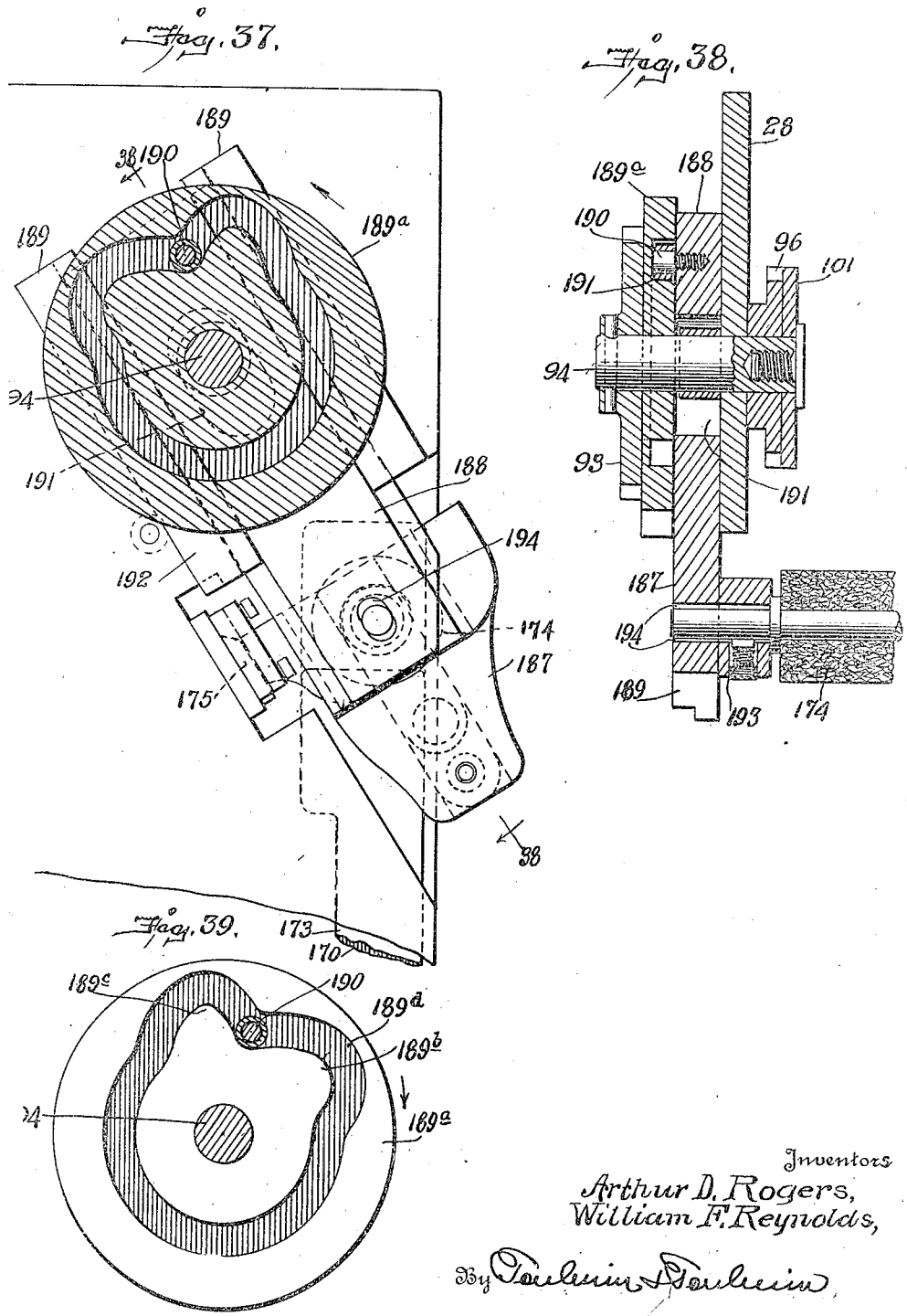

Aug. 5, 1924. 1,503,852
A. D. ROGERS ET AL
MACHINE FOR RECEIVING FARES, DELIVERING FARE TOKENS
OR COINS, AND ISSUING TRANSFERS OR TICKETS
Filed Sept. 28, 1921 19 Sheets-Sheet 16
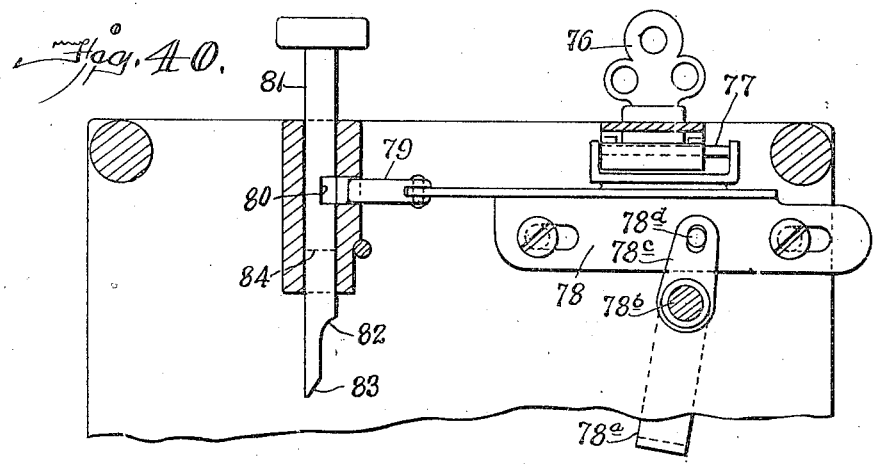
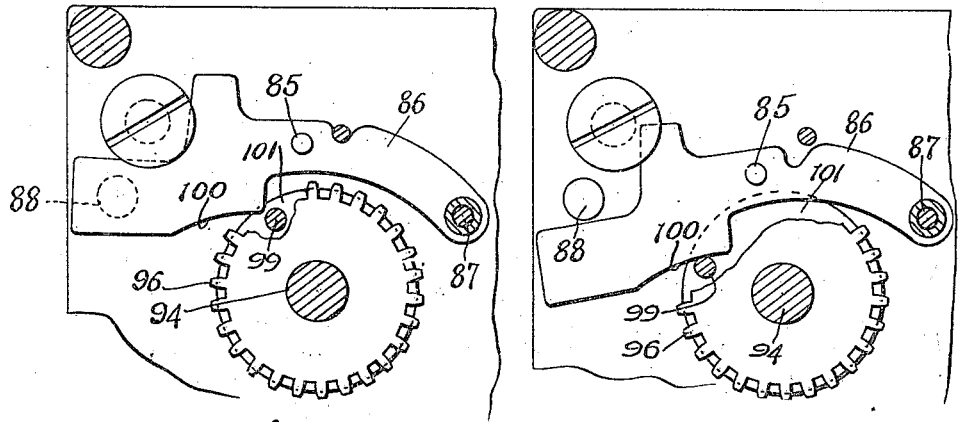
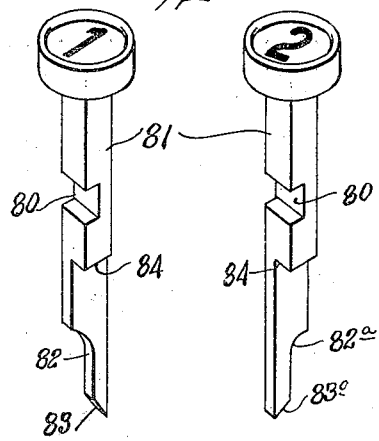
Inventors
Arthur D. Rogers,
William F. Reynolds,
By Toulmin & Toulmin
Attorneys

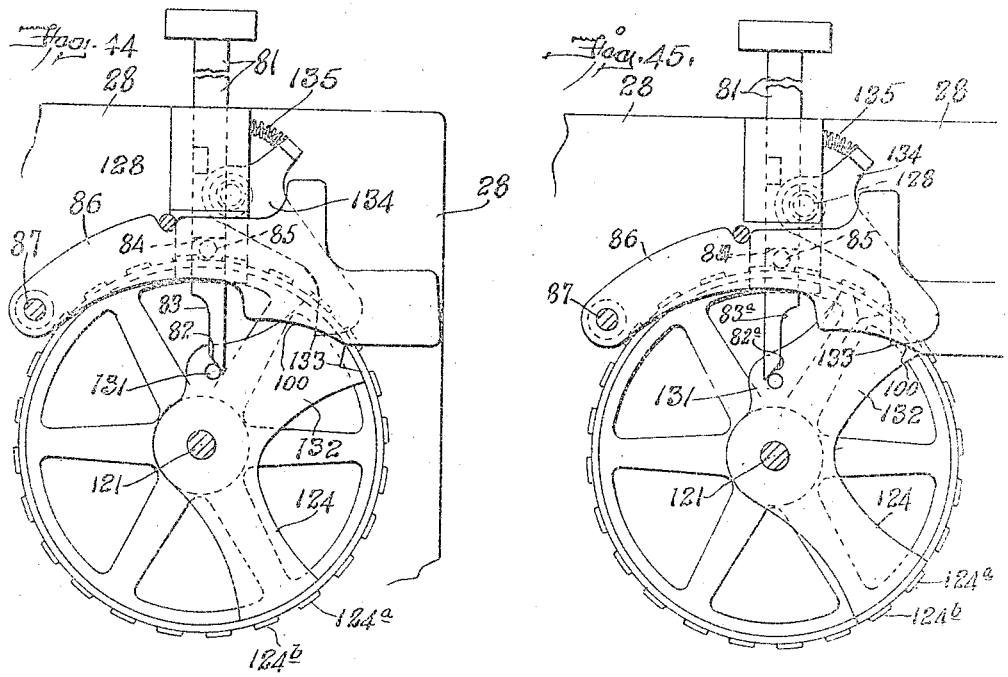
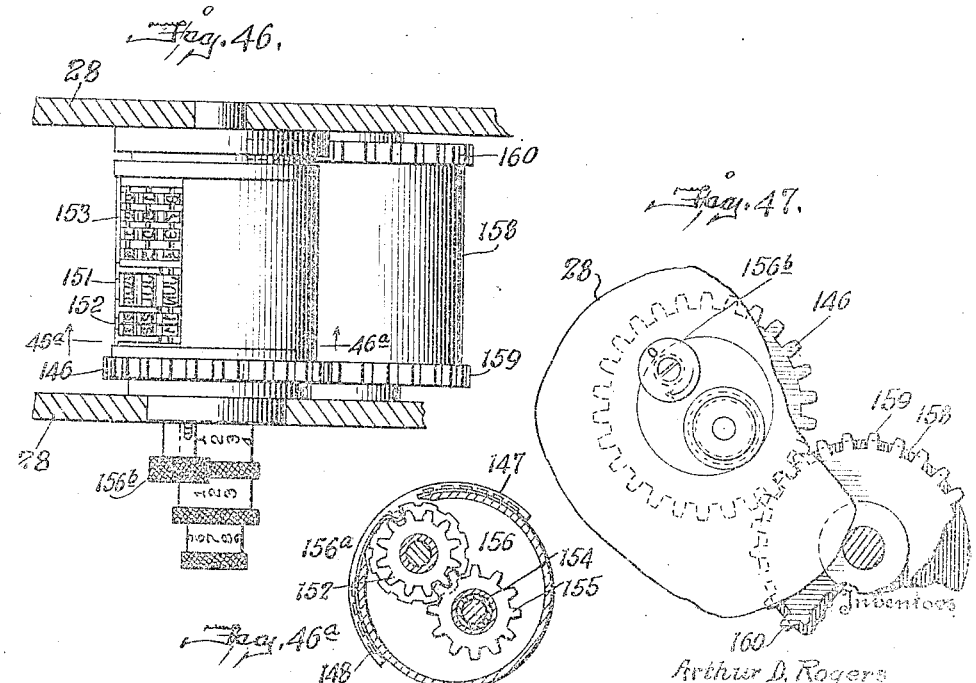

Aug. 5, 1924.
A. D. ROGERS ET AL
MACHINE FOR RECEIVING FARES, DELIVERING FARE TOKENS
OR COINS, AND ISSUING TRANSFERS OR TICKETS
Filed Sept. 28, 1921     19 Sheets-Sheet 18
1,503,852
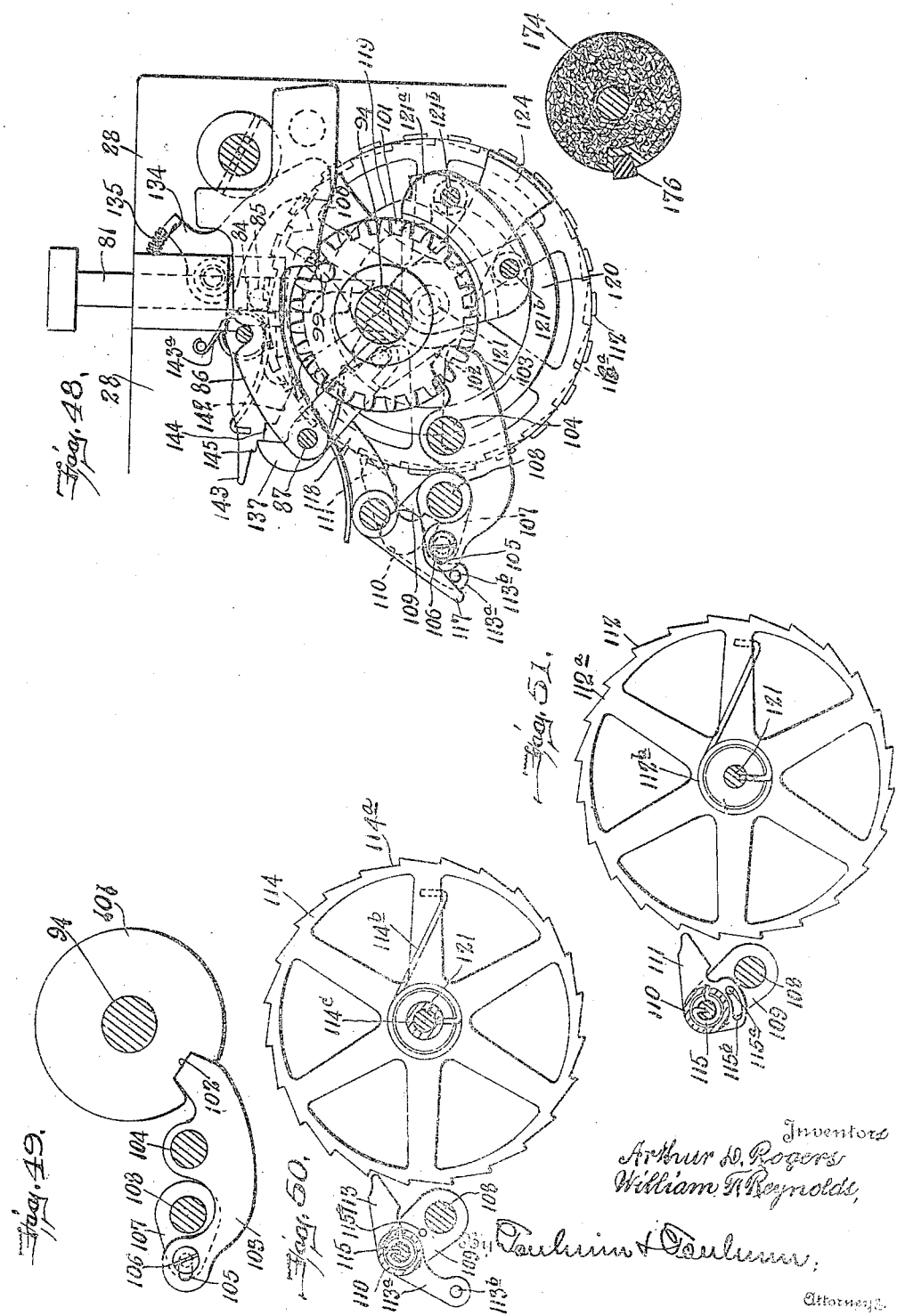

Patented Aug. 5, 1924.

1,503,852

UNITED STATES PATENT OFFICE.

ARTHUR D. ROGERS AND WILLIAM F. REYNOLDS, OF DAYTON, OHIO; SAID REYNOLDS ASSIGNOR, BY DIRECT AND MESNE ASSIGNMENTS, OF TWO-TENTHS TO SAID ROGERS AND ONE-TENTH TO GEORGE W. DURHAM, OF DAYTON, OHIO.

MACHINE FOR RECEIVING FARES, DELIVERING FARE TOKENS OR COINS, AND ISSUING TRANSFERS OR TICKETS.

Application filed September 28, 1921. Serial No. 504,001.

*To all whom it may concern:*

Be it known that we, ARTHUR D. ROGERS and WILLIAM F. REYNOLDS, citizens of the United States, residing at Dayton, in the county of Montgomery and State of Ohio, have invented certain new and useful Improvements in Machines for Receiving Fares, Delivering Fare Tokens or Coins, and Issuing Transfers or Tickets, of which the following is a specification, reference being had therein to the accompanying drawing.

This invention relates to improvements in machines for receiving fares, delivering fare tokens or coins and issuing transfers or tickets.

The general object of our invention is to provide such a machine with dual capacity, that is, capacity for receiving fares, if used on railway cars, or the price of admission if used by amusement houses, and for issuing tokens or coins aggregating in value the amount of money deposited in the machine, and capacity for issuing transfers, if the machine is on a railway car, or tickets, when in use at places of amusement.

Another object of our invention is the provision of mechanism by which the conductor or operator, through a simple manipulation, directs the deposited fare or entrance price into a money compartment which is identified with the particular conductor or operator so that all of the cash found in such compartment will represent cash received by such conductor or operator.

This also applies to the token that is deposited in the box by the passenger after he has received tokens in exchange for the money coin deposited; and such token is delivered into the appropriate compartment, identified with the particular conductor in the same manner as is the money deposited in the box, as stated above.

Another object of our invention is the provision of a group of full fare keys and group of half fare keys, so that the conductor by manipulating a full fare key will cause the machine to deliver to the passenger the appropriate number of tokens and by manipulating a half fare key will cause the machine to deliver double that number of tokens.

Another object of our invention is the provision of a coin receiver by which when the coin is deposited in the machine and the conductor or operator actuates a hand device the coin will be thereby directed into a chute, whence it will pass into the appropriate money compartment.

Another object of our invention, in respect to this coin receiver, is to afford the operator two views of the coin so that he may be certain of its denomination and that the passenger or customer has deposited the proper coin.

Another object of our invention is the provision of a carrier or slide equipped with a combined inking and pressure roller and with a severing blade, whereby, through appropriate devices, one movement of such carrier will cause the roller to ink the printing type, and another movement will cause the roller to press the tape or paper against the type followed immediately by the blade acting to then cut the ticket off the remainder of the web.

Another object is to operate the hour and minute printing wheels by clock mechanism, so controlled that the hour wheel will advance one step an hour, as from one o'clock to two o'clock, while the minute wheel will advance at each operation of the machine to print a figure or figures corresponding with the number of minutes that elapsed past the hour.

A further object of our invention is the combination with an hour-printing wheel and a minute printing wheel of a division-of-the-day, as a. m. or p. m., printer, a direction or north or south or east or west printer and a conductor's identification printer, so that the transfers or tickets issued by the machine will have printed thereon the hour and minute, the p. m. or a. m., the direction (in the case of a ticket issued by a machine on a railway car), and a number corresponding with the number of the particular conductor.

Still another object of our invention is the combination of clock mechanism as a motor and the hour printing wheel and minute printing wheel, and devices by which these wheels are alined up to bring their printing characters in alinement, notwithstanding that the minute wheel characters will most frequently be out of line with the hour wheel characters because of the difference in the speed of the two wheels. It is to overcome this lack of alinement of the printing characters that the wheels are to be alined up by mechanism independently of the clock mechanism.

And likewise it is one of the objects of the invention to provide means for overcoming any lagging of the hour wheel which would tend to put the hour number, as 5, behind the minute wheel end-of-the-hour character, as 00, as is fully hereinafter explained.

The foregoing and other incidental objects will be fully developed in the following specification.

In the accompanying drawings,

Fig. 1 is a side elevation of our improved machine;

Fig. 2 is a front elevation;

Fig. 3 is an elevation of the right hand or crank side of the machine;

Fig. 4 is an elevation of the transfer or ticket issuing side;

Fig. 5 is a plan view on an enlarged scale;

Fig. 6 is a vertical, sectional view on the line 6—6 of Fig. 5;

Fig. 7 is a sectional view on the line 7—7 of Fig. 5;

Fig. 8 is a horizontal, sectional view on the line 8—8 of Fig. 6;

Fig. 9 is a vertical, sectional view on the line 9—9 of Fig. 8, with the parts in what may be called normal position;

Fig. 10 is a detail side elevation of one side of the hour printing wheel;

Fig. 11 is an elevation of the other side of the same wheel;

Fig. 12 is a side elevation of the minute printing wheel;

Fig. 13 is a view of the layout of the hour wheel;

Fig. 14 is a view of the layout of the minute wheel;

Fig. 15 is a side view of the minute wheel, the a. m. and p. m. printer and the inking devices and cutter in readiness to move to inking position;

Fig. 16 is a side view of the same parts in printing position;

Fig. 17 is a side view of the minute wheel and direction or north or south or east or west printer;

Fig. 18 is a side view of the minute wheel and the conductor's identification printer;

Fig. 19 is a side elevation of the clock mechanism for operating the hour and minute wheels;

Fig. 20 is a similar view, on a larger scale, of a portion of said mechanism, the parts being in position for the machine to operate, that is, to permit the crank to be turned, the brake being off;

Fig. 21 is a similar view with the parts in position for the machine not to operate, the brake being on or clamped;

Fig. 22 is a sectional view on the line 22—22 of Fig. 8;

Fig. 23 is a vertical sectional view of the coin receiver, on an enlarged scale;

Fig. 24 is an inverted plan view of the same;

Fig. 25 is a transverse sectional view of the same on the line 25—25 of Fig. 24;

Fig. 26 is a sectional view on the line 26—26 of Fig. 9;

Fig. 27 is a vertical sectional view, on an enlarged scale, of one of the token magazines;

Fig. 28 is an enlarged partial plan and sectional view showing the token gates for cutting off and measuring and delivering the appropriate number of tokens;

Fig. 29 is an enlarged view of one section of the casing and of the token magazines, one for full fares and one for half fares, mounted on such section;

Fig. 30 is a face view of a transfer or ticket as the case may be;

Fig. 31 is a view of the reverse side of the same on which may be printed the rules or regulations required by law or custom to appear on a transfer or ticket.

Fig. 32 is an enlarged elevation showing the hour wheel, the train of gearing, and the impression roller mechanism;

Fig. 33 is a detail view on an enlarged scale of parts of the hour wheel and the impression mechanism, showing the parts ready to come into inking position;

Fig. 34 is a like view showing the parts in position to come into impression or printing action;

Fig. 35 is a corresponding view showing the same parts with the paper now being impressed against the printing characters;

Fig. 36 is a vertical sectional view taken on the line 36 of Figure 32, showing the operating parts in section;

Fig. 37 is an enlarged partial sectional view and elevation of the cam and sliding carriage operated thereby;

Fig. 38 is a sectional view taken on the line 38 of Fig. 37;

Fig. 39 is a detail view of the cam shown in Fig. 37 but in elevation instead of section and looking in the opposite direction;

Fig. 40 is an enlarged detail view in side elevation of the locking mechanism and of one of the operator's identification keys, key No. 1;

Fig. 41 is an enlarged side elevation of the devices employed for stopping and releasing the operating handle, showing them in position to stop the handle;

Fig. 42 is a similar view of the same parts showing them in position to release the handle or permit it to be rotated;

Fig. 43 is a perspective view of the two operators' identification keys;

Fig. 44 is an enlarged side elevation showing No. 1 key, for operator No. 1, ready to be depressed to present No. 1 printing character in printing position;

Fig. 45 is a similar view showing No. 2 key for operator No. 2 ready to be depressed to advance the printing character No. 2 to printing position;

Fig. 46 is a plan view of the month and date wheels and consecutive number wheels;

Fig. 46ª is a sectionl view showing the gears forming a part of the date printing mechanism;

Fig. 47 is a side elevation, enlarged, showing the gears for presenting the month and date and consecutive trip number characters to a printing position and for actuating the co-operating impression roller;

Fig. 48 is an enlarged detail view of the crank stopping and releasing devices, the minute wheel, the conductor's indentification printer and certain operating pawls;

Fig. 49 is a detail elevation of the devices by which the minute and hour wheels are given a slight advance movement to bring them into final printing position;

Fig. 50 is an enlarged elevation of the hour wheel and the co-acting pawl.

Figure 52:
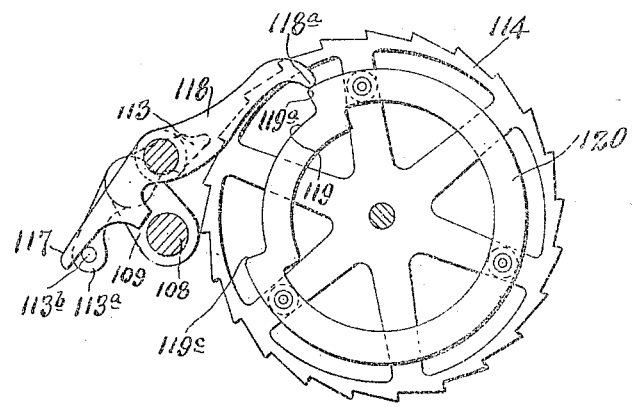
Figure 53:
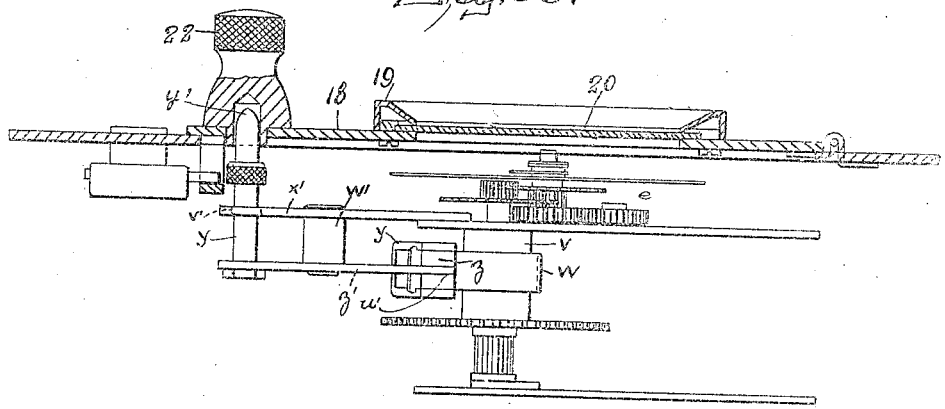

Fig. 51 is a like view of the minute wheel and its co-acting pawl;

Fig. 52 is an enlarged view of the hour wheel and the devices by which it is advanced to hour position in case it lags behind that position;

Fig. 53 is a sectional view on the horizontal line 53 on Fig. 1, showing particularly the break devices for breaking a part of the gearing and throwing it out of mesh with the escapement devices of the clock mechanism.

Referring to Figs. 1 and 2, it will be observed that we have shown our machine in side and front elevation, in which appear the casing or housing 1, preferably of sheet metal and in which is enclosed the operating mechanism except such features as occupy positions outside thereof. On this casing we mount the coin receiver consisting of a hopper 2 having a slotted cover 3, as more clearly shown in Fig. 6, for the reception of money or coins, and a box 4 containing rollers 5 and a belt 6 having cleats 7. Coins fall on the belt and are advanced by the cleats 7 as the belt is intermittently rotated until they fall into a chute 8. An actuating rod 9 is mounted to slide in the box 4 and provided with a spring detent 10 which when the rod is pushed in engages one of the cleats and gives the belt a sufficient movement to cause it to deliver the incumbent coin into the chute 8.

The rod 9 has a branch 9ª on which the spring detent 10 is pivoted and kept in contact with the belt by a coiled spring 10ª secured at 10ᵇ to the branch and contacting at 10ᶜ with the detent. The branch 9ª has an extension 9ᵇ guided by a bracket 9ᶜ and having a shoulder 9ᵈ. Between the shoulder and the bracket is located an expansion detent 9ᵉ which is compressed when the rod 9 is pushed inward and which when it expands returns the rod to normal position, carrying the spring detent 10 back to engage another cleat 7.

The coin passes from the chute 8 into a pivoted guide 11 adapted to direct the coin into either the money compartment 12, as for one conductor, or 13, for the other conductor, or operator, as the case may be. This guide is manipulated from the outside through an arm 14 connected to the guide and constituting a shield that overlaps the slot 15, as shown in Fig. 1. A button 16 connected to a pin 17, projecting from the shield, enables the user to tilt the guide to discharge into either of the money compartments.

As seen in Fig. 30, the transfer or ticket bears the legend "C1". This indicates conductor 1. Therefore, when the button 16 is adjusted to the end of the slot nearest "C1", as shown in Fig. 1, the guide 11 will direct the coin into that conductor's money compartment 12. And when the button 16 is adjusted near the legend "C2" the guide will direct the coin into the compartment 13 associated with conductor "C2".

The casing is so fashioned that access cannot be had to the money compartments except by the auditor or other appointed employee at stated times, according to the regulations of the user.

A hinged plate or door 18 permits access to the clock mechanism within the casing 1. A molding 19 surroundes an opening in this door and holds a glass disk 20 through which the clock dial and hands are seen. See Figs. 1 and 6. By inserting the key in the keyhole 21 the door 18 may be locked and unlocked and manipulated by a knob 22.

By inserting a key in a key-hole 23 the section of the casing which carries the door 18 may be unlocked and opened or removed.

When a passenger has deposited his money, say 25 cents, in the hopper the conductor will not only manipulate the receiver to deliver the coin into the chute 8 but also will manipulate one of the keys 24 (a 25¢ key) to deliver the appropriate number of fare tokens, say four, into a pan 25, from which the passenger will remove them and deposit one in the hopper 2, thence to be fed by the conductor into the chute and the appropriate money compartment. To this end we provide, and secure to the interior of the casing, say two token magazines, 26 for full fare tokens and 27 for half fare tokens. See Fig. 29. These magazines are in the nature of vertical tubes, adjacent to which are scales 26ª and 27ª, with numerals, say 16, 32, 48 and so on in multiples of 16, to 24. The length of the magazine above the first numeral and between the succeeding numerals is such as to accommodate 16 tokens, for the particular scale adopted for illustration. The tokens in the magazine 26 are full fare tokens and those in the magazine 27 are half fare tokens. One set of keys, as 24 a 25¢ key, 24ª a 50¢ key and 24ᵇ a $1.00 key, is used for discharging full fare tokens from the magazine 26 and another set of keys, 24ᶜ a 25¢ key and 24ᵈ a 50¢ key, is used to discharge half fare tokens from the magazine 27. (See particularly Figs. 26 to 29, inclusive).

The particular mechanism which we have illustrated as one form for measuring off the tokens from the magazines and delivering them to the pan 25 is best shown in Figs. 6, 7 and 26 to 29. But we would first state that mounted within the casing is a suitable frame composed of side plates 28 held together and in the casing by means of suitable cross rods 29, as indicated in Figs. 8, 9 and 26. A bracket 30 carried by this frame supports a shaft 31 on which are pivotally mounted the key bars 24ᵉ of the several keys. See Figs. 7 and 8 in particular.

The inner ends of the keys respectively connect with and operate a cord 32. These cords pass over a grooved pulley 33, as seen in Figs. 6, 7 and 26. The cords that are carried by the full fare key levers connect with magazine gates, as shown at 34 in Figs. 7, 26 and 28, while the cords that are carried by the half fare key levers connect, as shown at 35, with the gates at the bottom of the half fare magazine 27.

The purpose of these gates is to deliver from the magazines to the pan 25 the appropriate number of tokens, half fare or full fare, according to the amount of money deposited in the machine, say four full fare tokens for 25¢ or eight half fare tokens for 25¢.

Each magazine has three gates, the full fare magazine 26 a gate 36 for four full fare tokens, a gate 37 for another four full fare tokens and a gate 38 for eight full fare tokens; while the half fare magazine 27 has like gates, 39 for four half fare tokens, 40 for four half fare tokens and 41 for eight half fare tokens.

Referring first to the full fare magazine 26 and its gates it is to be understood that by the mechanism presently to be described four tokens will be delivered into the pan 25 when the conductor operates the 25¢ key, which will swing the gate 36 from under the magazine over to the feed hole 36ª which leads to the pan; that eight tokens will be delivered to the pan when the conductor operates the 50¢ key, which will swing both the gates 36 and 37 over the opening 36ª; and that when the conductor operates the dollar key, 16 tokens will be delivered into the opening 36ª because the operation of such key will swing not only the gate 38 but at the same time the gates 36 and 37 also.

Referring now to the half fare magazine and its gates it is also to be understood that by the mechanism presently to be described, when the conductor operates the 25¢ key both the gates 39 and 40 will swing together and deliver eight half fare tokens to the opening 41ᵉ; and that when the conductor operates the 50¢ key all three of the gates 39, 40 and 41 will swing over and drop sixteen half fare tokens into the opening 41ᵉ, whence they go to the pan 25.

Referring now to the construction of the gates 36, 37 and 38 for the full fare magazine it will be observed that they comprise a cup 36ᵇ, a cup 37ª and a cup 38ª. The first of these cups, 36ᵇ, has two arms 36ᶜ and 36ᵈ, the second cup 37ª has two similar arms 37ᵇ and 37ᶜ and the cup 38ª a hook arm 38ᵇ and a pivotal arm 38ᶜ. A stud 42 forms a pivot for these several arms, a washer 43 and screw 44 serving to hold the arms on the stud.

In order to close the bottom of each cup when the cup below it is swung off with its load of tokens, the arm 36ᵈ of the cup 36ᵇ is widened out, as shown at 45 in Fig. 28. Likewise, the arm 37ᶜ of the cup 37ª is widened out; and so also the arm 38ᶜ of the cup 38ª, so as to close the bottom of the magazine when the cup 38ª is swung from beneath it.

We have stated that when the 50¢ key is operated cups 36ᵇ and 37ª swing out to deliver eight full fare tokens. The reason that the cup 36ᵇ swings with the cup 37ª by the actuation of the 50¢ key only is that the adjacent arm 37ᵇ of the cup 37ª has a lug 37ᵈ, as seen best in Fig. 29, which overlaps or engages with the arm 36ᵈ of the cup 36ᵇ. And likewise the arm 38ᵇ of the cup 38ª has a lug 38ᵈ which engages with the arm 37ᶜ.

In order to return each gate to normal position under the magazine certain springs are provided. The spring 46 which is coiled about a portion of the arm 36ᵈ engages at one end with the arms of the gate 36 and at the other with a stud 47; and is put under tension when the gate 36 is swung to one side and therefore acts to return the gate to normal position. A like spring 48 engages at one end the arms of the gate 37 and at the other with the stud 47 and acts in the same way. And another like spring 49 engages at one end with the arms of the gate 38 and at the other with said stud 47 and acts in the same way. See particularly Figs. 9, 26 and 27. A part 50 of the gate 38 contacts with a stop 51 to arrest the recoil action of the spring 49 while the recoil action of the spring 48 is arrested by the contact of the arm 37$^c$ with the lug 38$^d$ of the adjacent arm of the gate 38; and while the recoil action of the spring 46 is arrested by the contact of the arm 36$^d$ with the lug 37$^d$ of the adjacent gate 37.

Referring now to the gates 39, 40 and 41 of the half fare magazine 27 it will be seen that the gate 39 comprises a cup 39$^a$ with arms 39$^b$ and 39$^c$. Also that the gate 40 comprises a cup 40$^a$, an arm 40$^b$ and an arm 40$^c$; and that the gate 41 comprises a cup 41$^a$ having an arm 41$^b$ and an arm 41$^c$. The arm 40$^b$ has a lug 40$^d$ which engages with the arm 39$^c$ of the gate 39; and also that the arm 41$^c$ has a lug 41$^d$ which engages with the arm 40$^c$ of the gate 40.

Thus when the 25¢ key of the half fare token magazine is operated both the gates 39 and 40 with their cups are actuated, while when the 50¢ key is operated all three of the gates, for the half fare tokens, 39, 40 and 41, with their cups, are swung to deliver half fare tokens into the half fare token opening 41$^e$.

Similar springs to those used with the gates for the full fare tokens are used with these gates for the half fare tokens, except that two instead of three springs are employed. One spring 52 coiled about the pivot pin 53 acts at one end on the arms of the lower gate, as seen at 54, and thereby also acts on the next gate 40, as both of these gates are operated at the same time, while the other end of such spring acts on the stud 55. Then the spring 56 also coiled about the pivot pin 53 acts at one end on the arms of the upper gate 41, as indicated at 57, and at the other end on said stud 55. As in the case of the other set of gates, so also in this set for the half fare tokens, a stop 58 is contacted by a part 59 of the upper gate which acts to check all the gates through the coaction of the lug 41$^d$ acting to stop the arm 41$^c$ of the next gate and the action of the lug 40$^d$ acting to check the arm 39$^c$ of the lower gate.

We will now refer to the mechanism by which the two sets of gates are operated. See particularly Figs. 7, 26 and 28. To the frame members 28 is attached a bar 60 supporting a pivot pin 61 on which are mounted, as best seen in Fig. 7, three actuating dogs 62, 63 and 64, by which the three gates for the full fare tokens are actuated. The dog 62 stands opposite to the arms of the lower gate 36 and when actuated through the cord 34 by the 25¢ key for the full fare token magazine, will swing said gate from under the magazine to a point over the coin opening 36$^a$. When the key is released the spring 62$^a$ acts to return the dog 62 to normal position, while, as before stated, the spring 46 would so act on the lower gate. The spring 62$^a$ is coiled about the stud 61 with one end contacting against a stop 61$^a$ on the bar 60, while the other end engages with the dog.

When the 50¢ key for the full fare magazine is operated the dog 63 is actuated through the cord 34$^a$ and made to actuate the gate 37, which by reason of the interconnection of one of its arms with one of the arms of the gate 36, through the lug 37$^d$, will cause both of the lower gates to be operated at the same time so as to deliver eight full fare tokens or 50¢ worth.

When the dollar key for the full fare magazine is operated the dog 64 is actuated through the cord 34$^b$ and by engagement with the arms of the gate 38 will swing it over to the coin opening 36$^a$. As sixteen tokens must be delivered when the dollar key is operated, the actuation of the dog 64 swings also the two lower gates 36 and 37 by reason of the contact of the lug 38$^d$ of the gate 38 and lug 37$^d$ of the gate 37, respectively, with arms of the gates 37 and 36. A spring 62$^b$ acts to return the dog 63 to normal position, while the spring 62$^c$ likewise acts on the dog 64.

Referring now to the devices for actuating the gates for the half fare magazines, and observing Figs. 5—9— and 26 in particular, it will be seen that the bar 60 also carries a stud 65 on which is pivoted two dogs, a lower dog 66 to operate the lower gates 39 and 40 and an upper dog 67 to operate the upper gate 41. Springs 68 act to return the dogs to normal position. The dog 66 is actuated by the 25¢ key for the half fares through a cord 69, while the dog 67 is actuated by the 50¢ key for the half fares through a cord 70. See Figs. 6, 9 and 26. We have before described that as eight half fare tokens are to be delivered when the 25¢ key is operated, and which delivery is effected by the two lower gates 39 and 40, the actuation of the dog 66 swings both of these gates. It contacts with the gate 40 which through the lug 40$^d$ engages the arm 39$^c$ of the gate 39 and thus both gates are swung at the same time and eight tokens are delivered. When the upper dog 67 is to be actuated so as to swing the upper gate 41, the 50¢ key and the cord 70 are employed. As also previously stated, when the upper gate for the half fares is swung to deliver tokens the two lower gates are swung at the same time. Thus all three gates for the half fares are swung when the dog 67 is actuated and thrown into contact with the gate 41, which through the lug 41$^d$ actuates the gate 40 and through the lug 40$^d$ actuates the gate 39.

It will now be seen from the first branch of our invention, that relating to the delivery to the passengers of full fare and half fare tokens, through the actuation of the token-branch of the machine by the conductor or other operator, that the mechanism acts with precision and rapidity and unfailing accuracy, whether dealing with full fare or fractional fare tokens. The term "tokens" we have used to define the medium of exchange between the passengers and the representatives of the operators of the cars. These tokens, so called, will usually be in the form of thin disks of metal or other material and will preferably be suitably inscribed, as with the term "full fare" or "half fare" or other fractional fare. We use the term "token" in this broad sense to designate any medium of exchange handed out by the machine for the money deposited in the box by the passenger.

We would further observe that while we have set forth this branch of our invention with reference to use on cars, particularly street and interurban cars, there are many other uses to which this branch of the invention may be applied, such as at theaters or other places where some form of token or medium is used and handed out to patrons to show that they are entitled to admission. These tokens may represent such admission mediums and in this sense be regarded as tickets appropriately printed or denominated to identify them with the institution using this machine to issue them to its patrons.

It will also be understood that various modifications may be made in the details of the mechanism we have thus far set forth in carrying out the objects and purposes of this branch of our invention.

We will now refer to the ticket-issuing-branch, and when we say "ticket-issuing" we have in mind also ticket printing, so that the term "issuing" includes printing the proper legends on the ticket as well as specifically issuing it.

Assume that the paper strip 71 has been fed by hand off of the reel 72 until it has passed through the guide tube 73 on until it has reached the point designated by the numeral 74. Then the machine being first unlocked, in a manner presently to appear, three cycles of operation of the crank 75, which makes two revolutions to a cycle, will feed off so much of the strip as will be but partially printed and be cut up into several waste pieces.

From that time on the printing on both sides of the strip will be in such sequence that with each severed piece, constituting a pass or ticket, the complete data will appear printed upon both sides; upon the face will appear the consecutive number of the transfer, (and when we say transfer we include by that term tickets also), the month, the date of the month, the hour and minute, the p. m. or a. m., the direction, as "S" for south, "N" for north, "E" for east and "W" for west, and "C 1" for conductor No. 1 or "C 2" for conductor No. 2, as the case may be, together with any advertising matter desired, as also the word "transfer" (or ticket), as the case may be, while on the opposite side will appear the rules of the road or institution using the machine.

The first step is to unlock the machine. This is done by inserting a suitable key 76 to unlock a suitable lock having a slidable tumbler 77, (see Fig. 40) which will operate the slide 78 to withdraw the locking pin 79 from a notch 80 in the conductor's key 81, say key No. 1 identifying conductor No. 1. Assuming there will be two conductors or operators who will alternately use the machine, the key of No. 1 will have the cam surfaces 82 and 83 on one side, say the left, as viewed in Figs. 43 and 44, and the key of conductor No. 2 will have the cam surfaces 82$^a$ and 83$^a$ on the opposite or right hand side, as seen in Figs. 43 and 45. The purpose of this is to throw by key No. 1 the type "C 1", meaning conductor No. 1, to printing position, and likewise to throw the type to print "C 2" meaning conductor No. 2 to printing position. In each case the conductor is thereby identified with the transfers he issues. This actuation of the slide 78 also removes from over the fare legend keys the stops 78$^a$ (see Fig. 8) mounted on a rockshaft 78$^b$ which has an arm 78$^c$ operated by a pin 78$^d$ on the slide 78. (See Fig. 40).

The second step is to depress the conductor's key 81 which unlocks the mechanism of the machine besides setting to printing position the particular type identified with the particular conductor. It unlocks the mechanism by its shoulder 84 coming in contact, when the key is depressed, with a pin 85 on a locking arm 86 pivoted on a cross shaft 87. (See Figs. 9, 41 and 42). The depression of this locking arm removes it from the position shown in Fig. 41 to that shown in Fig. 42, whereby it passes out of the path of the handle stop pin 88. See Figs. 22, 41 and 42. This stop pin is mounted in a sleeve 89 secured to one of the frame plates 28 and is thrown inward against the locking bar 86 by means of a spring 90 which acts against a shoulder on the pin and in the sleeve, as best seen in Fig. 22. When the bar is depressed in the manner described the spring 90 moves the stop pin inward and out of the path of the crank. Thus the crank can be revolved. This crank is mounted on a stud shaft 91, as shown in Figs. 7 and 8. A pinion 92 on such shaft meshes with a gear wheel 93 mounted on a short shaft 94 sustained by one of the plates 28. A spring controlled detent 95 engages this gear and serves to prevent its being turned backward. Inside of the plate the shaft 94 carries a gear wheel 96 whose office is to transmit motion to an idler gear 97 and thence on through as will be presently described, the stud shaft 94 supporting this gear 96.

The gear 96 also carries a pin 99 whose function is to engage with the surface 100 of the locking arm 86 to return it to normal or locking position, from the position shown in Fig. 42 back to that shown in Fig. 41, at the end of each cycle of operations, namely, after two revolutions of the crank. At that time the conductor's key is again depressed to throw this arm out of locking position preparatory to another cycle of operations for printing another transfer.

A cam plate 101 carried on the shaft 94 performs the office of operating certain detents by which the minute printing wheel and the hour printing wheel are given a slight advance or adjustment to bring them into final printing position, back of which they may have lagged due to the lost motion incident to the train of clock gearing actuated by a clock spring to cause these wheels to rotate in unison, the minute wheel with the minute hand and the hour wheel with the hour hand. In practice it is found that although these printing wheels are positively connected with the minute shaft and hour shaft, respectively, of the clock works they will, through lost motion lag a little behind the desired printing position. To overcome this they are given a slight advance movement at each operation of the machine, which also alines these wheels with each other to bring the appropriate printing characters in printing position. This cam plate 101 is the primary factor in effecting this advance movement. As seen in Fig. 9 and more clearly in the enlarged view shown in Fig. 48, it will be noted that the cam plate 101 has a depression 102 into which extends an actuating arm 103 hung on a stud 104 and having a slot 105 enclosing a pin 106 on a crank 107 fixed on a rockshaft 108. Therefore, when the arm 103 is swung by the action of the cam plate 101 it imparts a movement to this crank 107, the slot 105 allowing for any excess of movement of the arm as compared with the desired movement of the crank. This crank rocks the shaft 108 and moves another crank 109 which carries a short stud 110 on which are mounted a pawl 111 which gives a slight advance movement to the minute wheel 112, as shown in Fig. 9 and Fig. 51, and also a pawl 113 which gives the advance movement to the hour wheel 114, as shown in Fig. 50. Suitable springs 115 shown best in Figs. 50 and 51 operate to maintain the pawls 111 and 113 in delicate engagement with their respective wheels.

To prevent the spring 115 from swinging the pawl 111 too far down, a stop pin 115$^a$ is projected from the crank 109 into a slot 115$^b$ in the heel of the pawl. The slot permits the point of the pawl to rise sufficiently as it follows around the periphery of the wheel in making a stroke. See Fig. 51. Now see Fig. 50 from which it will be observed that the hour wheel pawl 113 has an extension 113$^a$ carrying a pin 113$^b$ whose office is to raise the lower end 117 of a detent 118 to cause its upper end to descend into a depression 119 in a cam 120 secured to the minute wheel, as best shown in Fig. 12.

By reference to Fig. 52 in connection with Fig. 12 the function and purpose of the depression 119 of the cam 120 on the minute wheel and the trip 118 will be understood. It has already been explained that the minute wheel pawl 111 and the hour wheel pawl 113 operate to overcome any lagging of those wheels, as also to aline the printing characters on these two wheels at the time of printing to present them to printing position. It is now also stated that another reason for having to aline them, although both are driven by the same clock mechanism, is that the minute wheel travels faster than the hour wheel and that consequently there are times when the minute numerals are between the hour numerals, that is, when one minute numeral is between two hour numerals. Hence, the plan of actuating these wheels to aline their printing characters, to overcome any lagging of either of these wheels, and to present them to printing position should their printing characters not be in such position when the printing moment arrives.

And it also happens that when the minute wheel 112 has completed the hour and the characters "00", which mean the end of one hour and beginning of another, are at the end-of-the-hour position, the hour wheel has not quite come up to that position with its hour numeral, as for instance 5, shown in the layouts in Figs. 13 and 14. In this situation it becomes necessary to aline the five hour mark with the "00" mark. To do this the hour wheel pawl 113 must be made to assume a position by which it will reach in and engage the tooth corresponding to the five hour mark on the hour wheel, instead of acting on the tooth in advance of such five hour tooth. This is accomplished by the devices shown best in Figs. 12 and 52, particularly the latter. Observe that the cam 120 on the minute wheel has reached the point where the corner 119$^a$, which corresponds to the position of "00" on that wheel, is about to pass by the end 118$^a$ of the trip 118. As shown, the lower end of the trip is opposite the point where the minute numeral 59 is located on the minute wheel.

In a minute the point 119$^a$ of the cam will pass the end of the trip and permit it to drop to the depressed surface 119. But observe also that the hour pawl 113 if now advanced for alinement purposes would not engage the five hour tooth and bring the hour wheel to an even hour position to agree with the expiration of the hour, as shown by "00" on the minute wheel. It is therefore necessary to drop the point of the pawl 113 inward, by tilting the other end outward. This is done by the trip 118 whose end 118$^b$ moves outward as its point 118$^a$ drops inward. This is caused by the action of the spring 115 shown best in Fig. 50, which throws the end 113$^a$ and its pin 113$^b$ outward as soon as permitted to do so by the outward movement of the end 117 of the trip 118. Thus the hour pawl will reach in and engage the tooth agreeing with the five hour numeral and advance the hour wheel, when this pawl makes its stroke by the means heretofore described, to bring the five hour mark opposite the "00" character of the minute wheel. A printing impression then taken will show that it was done at five o'clock.

And as the teeth on the hour wheel advance past the normal position of the pawl 113 at the rate of one tooth an hour, it is necessary to maintain the pawl 113 in such inner position for some fifteen minutes or until the next hour tooth shall have advanced far enough to be taken up by the next alinement stroke of the pawl 113. To keep the pawl in this inner position that length of time the length of the depressed portion 119 of the cam 120 is such that the trip 118 will remain for fifteen minutes in the position in which it permits the pawl to occupy its inner position. By the time the point 119$^c$ reaches the point 118$^a$ of the trip the next hour tooth will have advanced far enough for the hour pawl 113 to engage it.

After the minute and hour wheels have been advanced or alined, as above stated, they must be returned to the positions from which they were so advanced, being their normal or clock-operated positions. This is done by the use of delicate springs, the spring 112$^b$ for the minute wheel and the spring 114$^b$ for the hour wheel. See Figs. 50 and 51. When the wheels are in normal position these springs exert no force. When in advanced position they are under a slight tension. When the pawls 111 and 113 recede these springs gently return the wheels to normal or clock-operated positions.

The spring 112$^b$, see Fig. 51, engages a spoke of the minute wheel and connects with the shaft 121. The spring 114$^b$ engages a spoke of the hour wheel 114 and the hollow shaft 114$^c$, upon which the hour wheel is mounted. See Fig. 50.

In practice with this machine it has been found that sometimes, though not always, the hour wheel will lag enough to require this correction just described, and that while this mechanism will so operate when the condition requires, yet if the condition does not arise this mechanism will not interfere with the normal movement of the hour wheel.

It will now be understood that we have provided mechanism by which the hour and minute wheels are caused to present their printing characters in alinement at the moment of taking a print notwithstanding that by reason of the faster speed of the minute wheel it constantly happens that the minute character will be somewhere between the two hour characters; and also that in case of the hourly lagging of the hour wheel its hour characters are brought into alinement with the character following the 59th minute on the minute wheel, that is, the end of the hour character "00".

These minute and hour printing wheels have ratchet teeth 112$^a$ and 114$^a$, respectively, with which these pawls engage, besides bearing the type numerals to designate the hours and minutes, as best seen in Figs. 13 and 14.

Referring now to the several printing segments for printing the division of the day, as a. m. and p. m., and for printing the direction, as north and south and east and west, and for printing the conductor's identification mark, as C 1 or C 2, (see Figs. 8, 9, 10, 11, 15, 17, 18, 44, 45 and 48 particularly), the clock shaft 121, which clock will be referred to later, extends into the machine and carries, among other things, these three printing instrumentalities, of which 122 is the a. m. and p. m. printer, 123 the direction, or north and south and east and west printer, and 124 the conductor's identification printer. These devices are in the form of segments, as seen in the several figures and are set by hand to present the proper type to printing position except as to the a. m. and p. m. printer, which is set automatically.

The conductor's printer 124 carries a printing type 124$^a$, say for conductor No. 1, and a printing type 124$^b$ for conductor No. 2. One or the other of these types is to be adjusted into printing position. This adjustment is effected by the insertion of the conductor's key. (See Figs. 44 and 45). When key No. 1 is inserted its cam face 82 contacts with a pin 131 on the arm 132 and throws the type 124$^a$ for conductor No. 1 into printing position. When key No. 2 is inserted its cam face 83$^a$ shifts the pin 131 in the opposite direction and presents the type 124$^b$ into printing position. The arm 132 has notches 133 into which the spring urged pawl 134 will engage according to the position of the arm and hold the segment in printing position. A spring 135 urges the pawl on its pivot 128, that is, the same pivot that carries the pawl 127 for the direction printer, to be presently mentioned. The conductor will also at the same time adjust the coin guide 11 to discharge either into the compartment 12 to receive coins deposited while conductor No. 1 is in charge or to discharge into compartment 13 to catch coins received while conductor No. 2 is in charge. See Fig. 1 where 16 shows the abutment by which the guide is adjusted and seen Fig. 6 also.

The direction printer 123, as best seen in Fig. 17, has a handle 123ª by which the operator can set the type 125 to print, say south, or type 126 to print, say north.

In order to hold the segment 125 in proper position a spring urged pawl 127 is mounted on a suitable pivot 128 and actuated by a spring 129 to keep its point in one or the other of the notches 130.

Referring now to the a. m. and p. m. printer, see Figs. 8, 10, 11 and 15 particularly. Observe in Fig. 15 that the p. m. type is in printing position. It will remain so for twelve hours when the hour wheel 114 will have revolved to a point where its pin 114ª comes in contact with the member 136 of a double rocker arm. The pin will lift the arm and shift the member 137 from the shoulder 145 to the shoulder 144, as seen in Fig. 11, and thus throw the arm 138 upward. See Fig. 15. This arm and the rocker are both secured to the same shaft 139. This movement of the arm 138 will have shifted the segment 122 to present the a. m. type to the printing position. The arm 138 carries a pin 138ª which travels in a slot 138ᵇ in the segment. A spring 140 acts on the arm 138 and thence on the rocker 136 and 137 to keep the rocker in its proper position.

In order to change the segment 122 back to p. m. position, when the time arrives, the reverse side of the hour wheel 114, the side shown in Fig. 10, which is the side opposite to that shown in Fig. 11, is provided with a pin 141 which contacts with the bevel surface 142 of the trip 143. As shown in Fig. 10 the pin has just passed by the trip. When the trip was raised it freed the tumbler from contact with the notch 144 and permitted it to engage with the notch 145 under the influence of the spring 143ª. This new position of the tumbler acting on the arm 138 causes the segment 122 to again place the p. m. type in printing position.

Referring again to the crank 109 it will be seen from Fig. 10 that a stop pin 109ª acts to limit one movement of the crank, if for any reason it tends to proceed too far.

The inner end of the clock shaft 121, which, as stated, is the shaft of the minute wheel, is mounted in a bracket 121ª secured by screws or devices 121ᵇ to one of the frame plates 28. This bracket is clearly seen in Fig. 48.

Referring to the train of gearing and the devices operated thereby it will be seen on reference to Figs. 9 and 32 that the idler gear 97 meshes with a gear 146 which carries a drum having printing plates 147 and 148 for printing any advertising matter, such as suggested by the waving lines 149 and 150 in Fig. 30. The drum also carries a conventional printing wheel 151 for printing the months and a similar printing wheel 152 for printing the days of the month, as also a series of consecutive numbering wheels 153, as seen in Figs. 46 and 46ª. The setting shaft 154 and gears 155 carried within this drum set the month and date wheels while the sleeve 156ª surrounding the shaft 156 sets the consecutive number devices. This sleeve is controlled by the knurled head 156ᵇ extending outside of the frame member 28. The setting shaft 154 and gears 155 are also carried within this drum. A shaft 156 carries the month, date and consecutive number wheels.

When the crank is operated the gear 146 properly presents these several printing wheels to printing position in successive order. An inking roller 157 is driven by contact with the printing plates 147 and 148 to present new surfaces for delivering ink to these plates and to said wheel.

To sustain the paper against these printing plates and wheels as they revolve and press upon the paper, a pressure roller 158 is provided and duly mounted in the frame plates, as are all of these other rollers and gears. A gear 159 on the impression roller 158 meshes with the gear 146 and thereby receives motion. Another gear 160 on this impression roller, there being a gear at each end, as seen in Figs. 32 and 46, meshes with a gear 161, in the nature of an idler, since it transmits motion from gear 160 to the gear 162 of the printing roller 163. A pin 164 on the gear 161 comes in contact with the end 165 of an actuating arm 166 pivoted at 167 and adapted by means of a slot 168 to act on a pin 169 attached to a slide 170, as best seen in Fig. 36, and by means of a slot 171 to act on a pin 172 carried by another slide 173. These slides are utilized in actuating the carriage in which are mounted the combined inking and pressure roller 174 and a knife blade 175 in a manner to be later explained. But the relation of the parts is such that when the machine is in operation the roller 174 first inks the hour and minute wheels and then presents its pressure bar 176 against the paper to press it against these printing wheels, as also against the segments which print the conductor's number, the direction number and the a. m. and p. m. The blade 175 is also advanced by these means at the right time to sever the web of paper to leave free the end which then constitutes a completely printed transfer or ticket. An inking roller 177 is frictionally revolved by the printing surface 178 so as to ink the type thereon in order to print the rules of the railroad or other institution using the machine.

Referring now to the operation of the actuating lever 166 and the slides 170 and 173 attention is called to Figs. 32, 33, 34, 35 and 36. In Fig. 32 the inking and pressure roller 174 is to be rotated in the direction of the arrow to ink the printing characters on the minute and hour wheels, the conductor's identification character, the direction characters and the a. m. and p. m. This roller is elevated to and against these characters for this purpose by means presently to appear. We are now describing the rotary motions of the roller. From the position shown in Fig. 32 to that shown in Fig. 33 the roller 174 is inking said characters. Then it is rotated reversely from the position in Fig. 33 to that in Fig. 35 when the impression bar, as seen, will be presented to press the paper against the printing characters. The first of these partial rotations of the roller, anticlockwise is effected by moving the toothed segment 179 clockwise from the position in Fig. 32 to that in Fig. 33. In doing so it meshes with the pinion 180 on the impression roller shaft. The clockwise partial rotation of the roller 174 is then effected by the anticlockwise movement of this segment to the position shown in Fig. 35.

The first or clockwise movement of the segment is produced by the slide 173 by the lifting action of the pin 172 on said slide, and the slot 171 in the actuating arm 166; as also by a slot 181 in the said slide 173 acting on a pin 182, on the upward movement of the slide 173.

During this movement of said slide the other slide 170 travels also, but somewhat differentially because of the position of the slot 168 in the actuating bar 160 as compared with the slot 171. But when the time comes for the segment to be reversed and returned from the position shown in Fig. 33 to that shown in Fig. 35, the slide 170 will begin to act on the pin 182 on the segment, which takes place when the down stroke of the actuating bar commences. This bar has a slot 183, as seen by the dotted lines in Fig. 32, the portions 184 of which act on the pin 182 on this downward movement of the slide 170 and thereby cause the segment to make such return movement.

Thus, it will be understood that the segment 179 is oscillated at the proper time and the inking and impression roller 174 is given rotary reciprocating motion to first ink the printing characters and then to press the paper against them.

The downward stroke of the actuating arm 166 is effected by the action of the pin 164 on the idler 161 when that pin begins to travel on the portion 185 of the cam surface of this actuating arm. See the dotted lines in Fig. 32.

Referring again to the printing roller 163 it will be seen from Fig. 9 that opposite to it is placed an impression roller 186 which is driven by frictional contact and acts to impress the paper strip against the printing plates 178 carried by this printing roller.

We shall now refer to the mechanism by which the inking and impression roller 174, the roller which has the rotary reciprocating motion, is moved to and from the hour and minute wheel and the printing characters on the several segments. This mechanism comprises a slidable carriage 187, (see Figs. 9 and 37 particularly, as also Fig. 8), where the extension 188 of this carriage is shown slidably mounted in ways 189 secured to one of the side plates 28. This extension is reciprocated and moves the carriage 187 to and from said printing characters. This movement is so timed that the carriage moves toward the printing characters at the time the roller 174 is due to impress and ink the type, and then to recede and return again at the time the impression bar 176 on the roller 174 has been rotated to printing position, as shown in Fig. 35 particularly, to impress the paper against the type.

The means for effecting these reciprocating movements of the carriage 187 comprise a cam slot 189$^d$ formed in the cam head 189$^a$ which acts on a pin 190 carried by the extension 188 of the carriage. The extension 188 has a slot 191 which permits it to slide under the action of the cam and pin. The extension 188 of the carriage 187 is slidably mounted in fixed ways 189 secured to the plate 28.

In this way the inking and impression roller 174 is presented to the printing characters in proper time with the rotative movements of that roller, first to ink and next to press the paper against the type. To permit the roller 174 to yield somewhat, notwithstanding that the carriage 187 has a fixed movement, the shaft of the roller, as clearly seen in Fig. 38, is supported by a yielding bearing comprising a spring 193, the opening 194 in the carriage for the roller shaft being slightly enlarged. This spring bearing is at each end of the roller 174.

The carriage 187 also sustains and operates a paper cutting plate 175 which comes into operation and severs the paper strip on the impression stroke of the carriage and roller 174. The actual cutting of the paper takes place just as the impression of the paper against the type is completed. To this end the blade 175 is given a slight additional advance against the paper at the moment the printing operation is completed. This is effected through the action of the cam just described, for it will be seen that the cam has two throw-surfaces, one designated 189[b] for operating the carriage 187 to effect inking and impression movements, and the other designated 189[c] to give the carriage this further movement for imparting to the cutting-blade this further advance against the paper to sever it, as above described. See particularly Figs. 37, 38 and 39 for this mechanism.

Referring now to the clock mechanism by which the hour and minute printing wheels are primarily operated, attention is called to Figs. 8 and 19 to 22. These clock works are of the usual or conventional kind and will therefore not be described in detail. It is sufficient to say that the spring 196 drives a master gear $a$ whose shaft carries a pinion $b$ which meshes with a gear $c$ mounted rigidly on the sleeve 121 which carries the hour wheel 114.

Then the master wheel meshes with another pinion $d$ which rotates the shaft $e$ that operates the minute wheel 112.

Thus the two wheels are clock driven.

The shaft $e$ also carries a pinion $f$ which meshes with a pinion $g$ of the same size to drive the minute hand shaft $h$. On this shaft is a pinion $i$ which drives a gear $k$ whose pinion $l$ drives a gear $m$ secured to the hour sleeve $n$, which sleeve carries the hour hand.

The remainder of the gears are concerned with the brake mechanism. They comprise the gear $o$ on the shaft $e$ and the pinion $p$ with which $o$ meshes. The shaft $q$ carries the pinion $p$ and rotates the gear $r$, which in turn drives the pinion $s$ and rotates the gear $t$ which operates the escapement devices $u$.

To one side of the pinion $p$ and on the shaft $q$ is a friction collar $v$ adapted to be clamped by a brake band $w$ whose arms $x$ are within a yoke $y$. A shaft $z$ connects the yoke with a lever $z'$ pivoted at $w'$ on a stud carried by a rigid arm $x'$ extending from the clock frame. A stud $y'$ on the lever $z'$ travels in a slot $v'$ in the arm $x'$. When the pin $y'$ is in the upper position shown in Fig. 21, it causes the point $u'$ to bind the brake band on the friction collar $v$ which has the effect of stopping the clock mechanism for the purpose of preventing the clock-spring from running the gear train wild. And this adjustment of the lever $z'$ also throws slightly downward the shaft $q$, which is mounted in the arms $q'$, pivotally hung on the shaft $e$, and having extensions $q''$ and a stop pin $q'''$, which contacts with the clock-frame to limit the downward swing of the arms $q'$. This downward adjustment of the shaft $q$ moves the gear $r$ out of mesh with the pinion $s$, which, through the gear $t$ and pinion $u$ connects with the escapement-mechanism. When this is done the operator may set the clock-hands to agree with the correct time and correspondingly set the hour and minute wheels.

And when the pin $y'$ is in this upper position the door 18 cannot be closed because the pin will not register with the socket within the handle 22, as shown in Fig. 53. This insures that the person in charge of the machine, such as a street car conductor or a ticket clerk in an amusement place, will see that the machine is ready to operate and that the clock is duly wound up and everything in readiness for use, because otherwise he cannot close this door. But when he has done the necessary things to put the machine in operative condition and has placed the pin $y'$ in its lower position, it will enter the recess in the knob 22 and thus indicate that the machine is ready for the conductor or other operator.

While my token mechanism and coin receiving and directing mechanism are not claimed herein, yet as they are such an intimate part of my machine and as an understanding of the machine as a whole is greatly facilitated and made plainer to the public by the description and illustration of such token and coin mechanism, I have illustrated and set forth herein the same for that reason.

Having thus fully described our invention, what we claim as new and desire to secure by Letters Patent, is:—

1. In a machine of the character described, the combination with locking devices and a conductor's key adapted to be locked and unlocked thereby, of crank mechanism, a locking arm, and a device controlled thereby to permit of or prevent the rotation of the crank, said locking arm adapted to be actuated by the conductor's key to release such device to permit the crank to be rotated.

2. In a machine of the character described, the combination with locking devices, and a conductor's key adapted to be locked and unlocked thereby, of a locking arm, an operating crank and a stop device between the crank and the locking arm, the conductor's key being adapted to actuate said locking arm to free such stop device.

3. In a machine of the character described, the combination with a lock, a conductor's key, a pivoted locking arm, a crank, a spring-actuated stop pin, the conductor's key being adapted to move the locking arm out of alinement with said pin to permit the pin to allow the crank to revolve.

4. In a machine of the character described, the combination, with a locking arm, of a conductor's key adapted to actuate said arm to throw it from normal position, and a rotatable member adapted to contact with said arm and return it to normal position.

5. In a machine of the character described, the combination with locking devices, a conductor's key adapted to be locked and unlocked thereby, a locking arm adapted to be moved from normal by said key, a rotatable device adapted to turn the arm to normal, an operating crank, a stop device between it and the locking arm, a train of gearing operable by the crank when the parts are unlocked, hour and minute printing wheels and clock mechanism to rotate them, an inking and pressure device operable by part of the gearing, month, date and trip printing wheels, and inking and pressure devices therefor, a rules printing device and inking and impression devices therefor, all operable through the gearing, a paper strip guide adapted to direct the strip to receive printed impressions, and a severing device to cut off tickets or passes after the printing operations.

6. In a machine of the character described, the combination with locking devices, a conductor's key adapted to be locked and unlocked thereby, a locking arm adapted to be moved from normal by said key, a rotatable device adapted to turn the arm to normal, an operating crank, a stop device between it and the locking arm, a train of gearing operable by the crank when the parts are unlocked, hour and minute printing wheels and clock mechanism to rotate them, conductor's identification number, direction and division of the day printing devices, an inking and pressure device operable by part of the gearing, month date and trip printing wheels, an inking and pressure devices therefor, a rules printing device and inking and impression devices therefor, all operable through the gearing, a paper strip guide adapted to direct the strip to receive printed impressions, and a severing device to cut off tickets or passes after the printing operations.

7. In a machine of the character described, the combination, with hour and minute printing wheels and clock mechanism to rotate said wheels, said clock mechanism having yielding resilient connection with said wheels, of devices to act on said wheels to line up their printing characters from unalined relative positions to printing position.

8. In a machine of the character described, the combination with hour and minute printing wheels and clock mechanism to rotate said wheels, of devices to act on said wheels to aline up their printing characters from unalined relative positions to printing position, said devices comprising alining pawls, one for the hour and one for the minute wheel, and intermediate mechanism for actuating said alining pawls.

9. In a machine of the character described, the combination with hour and minute printing wheels and clock mechanism to rotate said wheels, of devices to act on said wheels to aline up their printing characters from unalined relative positions to printing position, said devices comprising alining pawls, one for the hour and one for the minute wheel, intermediate mechanism for actuating said alining pawls, and mechanism to operate said intermediate devices when the machine crank is turned.

10. In a machine of the character described, the combination with hour and minute wheels and clock mechanism to rotate them, of alining devices for said wheels consisting of a pawl adapted to engage the hour wheel, another pawl the minute wheel, a rockshaft to operate said pawls, a pivoted arm to actuate said rockshaft, a cam plate to operate said arm, and connections between the cam plate and the hand crank, whereby when the latter is operated said pawls are advanced against said wheels to aline their printing characters.

11. In a machine of the character described, the combination with hour and minute wheels having printing characters and peripheral teeth and clock mechanism to rotate said wheels, of devices to aline the printing characters on the wheels comprising a pawl for each wheel adapted to engage with said wheel teeth, means to advance said pawls against said teeth and to return them, and means to cause said wheels to return to their relative rotative position produced by the clock mechanism when the pawls are returned to normal.

12. In a machine of the character described, the combination with an hour and minute wheel having printing characters indicative of hours and minutes and having a circular series of teeth and clock mechanism to rotate said wheels, of alining devices therefor comprising a pawl for each wheel adapted to engage said teeth to bring the printing characters in alinement, cranks to actuate said pawls, a rockshaft to actuate said cranks, a pivoted arm to rock said shaft, a cam to actuate said arm, an operating crank and connections between it and said cam, and spring devices to return said hour and minute wheels to their clock-operated positions when released from the alining operation by the pawls.

13. In a machine of the character described, the combination, with hour and minute wheels and clock mechanism to operate them, of alining devices adapted to actuate said wheels to bring their printing characters from unalined to alined position, and mechanism to cause the hour wheel alining device to advance the hour wheel to aline its hour numeral with the end-of-the-hour character of the minute wheel.

14. In a machine of the character described, the combination with an hour and a minute wheel and clock mechanism to operate them, of an alining pawl for each wheel, means to actuate said pawls to cause them to aline the printing characters on one wheel with those on the other, and a trip device to cause the hour wheel pawl to engage the hour wheel when lagging behind the minute wheel at the end of an hour to advance the hour wheel and overcome its lagging.

15. In a machine of the character described, the combination with an hour and a minute wheel and clock mechanism to operate them, of a pawl for the minute wheel and a pawl for the hour wheel to aline their printing characters, means to operate said pawls, a cam device on the minute wheel and a trip controlled by the cam and adapted when the minute wheel reaches the end of an hour to permit the hour pawl to engage the hour wheel if lagging in order to advance it to the end of the hour position corresponding with the minute wheel position.

16. In a machine of the character described, the combination with an hour wheel having teeth and a like minute wheel, of a pawl adapted to engage the teeth of the minute wheel and another pawl the teeth of the hour wheel, a cam on the minute wheel, a trip operable by said cam and adapted to release the trip to throw the hour pawl into engagement with the hour wheel if lagging, said cam device continuing such engaging position of the hour pawl through a period of time within which the hour wheel will advance to be engaged by the hour pawl in its normal position, and clock mechanism to operate said wheels.

17. In a machine of the character described, the combination with a carriage and an inking and pressure roller supported thereby, of a tooth segment adapted to rotate said roller, slides, one adapted to swing the segment in one direction and the other to swing it in the opposite direction, an actuating arm for said slides, and devices to operate said arm.

18. In a machine of the character described, the combination with a carriage and its inking and pressure roller having a pinion, of a toothed segment meshing with said pinion, a slide to actuate the segment in one direction and another slide to actuate it in the opposite direction, a pivoted actuating arm connected with said slides and adapted to move them in such relation that the one actuates the segment in one direction and the other actuates it in the opposite direction, a pivoted actuating arm having cam connection with said slides and a rotatable member adapted to actuate said arm in one direction and in the other.

19. In a machine of the character described, the combination with a printing wheel, of a p. m. or a. m. printing segment, and a tumbler adapted to be actuated by the wheel at a predetermined time, and a crank operated by the tumbler to shift the segment from one position to another to print the p. m. or a. m. designation.

20. In a machine of the character described, the combination with a printing wheel, of an a. m. and p. m. printing segment mounted on the wheel shaft, a tumbler adapted to be actuated by the wheel at a predetermined time, a pawl to actuate the tumbler in its operative positions, a crank operated by the tumbler and connected with the segment and adapted through the pawl to hold the segment in either position to which the tumbler has shifted it to print either p. m. or a. m.

In testimony whereof, we affix our signatures.

ARTHUR D. ROGERS.
WILLIAM F. REYNOLDS.